(12) United States Patent
Shimura

(10) Patent No.: US 10,699,541 B2
(45) Date of Patent: Jun. 30, 2020

(54) RECOGNITION DATA TRANSMISSION DEVICE

(71) Applicant: SHARP KABUSHIKI KAISHA, Osaka-shi, Osaka (JP)

(72) Inventor: Tomoya Shimura, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 93 days.

(21) Appl. No.: 15/105,452

(22) PCT Filed: Dec. 8, 2014

(86) PCT No.: PCT/JP2014/082371
§ 371 (c)(1),
(2) Date: Jun. 16, 2016

(87) PCT Pub. No.: WO2015/093330
PCT Pub. Date: Jun. 25, 2015

(65) Prior Publication Data
US 2016/0335861 A1 Nov. 17, 2016

(30) Foreign Application Priority Data
Dec. 17, 2013 (JP) ................................. 2013-260425

(51) Int. Cl.
*G08B 13/196* (2006.01)
*H04N 7/18* (2006.01)

(52) U.S. Cl.
CPC . *G08B 13/19613* (2013.01); *G08B 13/19663* (2013.01); *H04N 7/188* (2013.01)

(58) Field of Classification Search
None
See application file for complete search history.

(56) References Cited

U.S. PATENT DOCUMENTS 6,049,281 A * 4/2000 Osterweil ............ A61B 5/1128
340/573.1
8,704,668 B1 * 4/2014 Darrell ................ A01K 29/005
340/500

(Continued)

FOREIGN PATENT DOCUMENTS

JP 2002-135760 A 5/2002
JP 2005-318445 A 11/2005

(Continued)

OTHER PUBLICATIONS

Chen MC, Liu YM. An indoor video surveillance system with intelligent fall detection capability. Mathematical Problems in Engineering. Nov. 24, 2013;2013.*

(Continued)

*Primary Examiner* — Vu Le
*Assistant Examiner* — Tracy Mangialaschi
(74) *Attorney, Agent, or Firm* — Birch, Stewart, Kolasch & Birch, LLP

(57) ABSTRACT

A feature of a part or the entirety of a body of a person is detected from a captured video; the person in the video is specified from the detected feature; user information indicating physical features of the person is detected from the feature related to the specified person; motion information including a motion or a gesture with a body and hands of a user is detected from the user information and the captured video; a behavior including the motion of the person is recognized from the motion information and the user information; recognized behavior information is divided for each behavior of the person; the divided behavior information is generated as block data; and the generated block data is transmitted to an outside for each block.

14 Claims, 14 Drawing Sheets

(56) References Cited

U.S. PATENT DOCUMENTS

| | | |
|---|---|---|
| 2010/0026842 A1 | 2/2010 | Ishizaka |
| 2011/0007946 A1* | 1/2011 | Liang .................. A61B 5/1113 382/103 |
| 2015/0170354 A1 | 6/2015 | Mukai |

FOREIGN PATENT DOCUMENTS

| | | | |
|---|---|---|---|
| JP | 2007243342 A | * | 9/2007 |
| JP | 2007243342 A | | 9/2007 |
| JP | 2009-9413 A | | 1/2009 |
| JP | 2009009413 A | * | 1/2009 |
| JP | 2009-033564 A | | 2/2009 |
| JP | 2009033564 A | * | 2/2009 |
| JP | 2010-039724 A | | 2/2010 |
| WO | WO2013/183738 A1 | | 12/2013 |

OTHER PUBLICATIONS

Zouba, Nadia, et al. "Monitoring activities of daily living (ADLs) of elderly based on 3D key human postures." Cognitive vision. Springer, Berlin, Heidelberg, 2008. 37-50.*

Zhou, Zhongna, et al. "Activity analysis, summarization, and visualization for indoor human activity monitoring." IEEE Transactions on Circuits and Systems for Video Technology 18.11 (2008): 1489-1498. (Year: 2008).*

Ozcan K, Mahabalagiri AK, Casares M, Velipasalar S. Automatic fall detection and activity classification by a wearable embedded smart camera. IEEE journal on emerging and selected topics in circuits and systems. Apr. 24, 2013;3(2):125-36. (Year: 2013).*

Japanese Office Action for Japanese Application No. 2015-553487, dated Feb. 20, 2018.

* cited by examiner

FIG. 5

| FIELD NAME | SIZE (Byte) | CONTENT |
|---|---|---|
| BLOCK ID | 3 (FIXED LENGTH) | BLOCK ID (START FROM 0) |
| BLOCK PRIORITY | 1 (FIXED LENGTH) | PRIORITY OF BEHAVIOR INFORMATION (START FROM 1) (0 x FF INDICATES EMERGENCY DATA) |
| BEHAVIOR ID | 1 (FIXED LENGTH) | ID WHICH INDICATES BEHAVIOR (0: NO BEHAVIOR INFORMATION, 255: EXTENSION FLAG) |
| STARTING TIME | 4 (FIXED LENGTH) | FRAME AT WHICH ONE BEHAVIOR IS STARTED (frame) |
| BEHAVIOR TIME | 4 (FIXED LENGTH) | THE NUMBER OF FRAMES DURING WHICH ONE BEHAVIOR IS BEING PERFORMED (frame) |
| FRAME RATE ID | 1 (FIXED LENGTH) | ID WHICH INDICATES FRAME RATE OF VIDEO (0: NO FRAME RATE INFORMATION) |
| ADDITIONAL INFORMATION SIZE | 2 (FIXED LENGTH) | ADDITIONAL INFORMATION SIZE (Byte) |
| ADDITIONAL INFORMATION | 0 TO 65535 (VARIABLE LENGTH) | ADDITIONAL INFORMATION |

| FIELD NAME | SIZE (Byte) | CONTENT |
|---|---|---|
| BEHAVIOR RELIABILITY | 2 (FIXED LENGTH) | RELIABILITY OF BEHAVIOR INDICATED BY BEHAVIOR ID |
| FACE IDENTIFICATION ID | 2 (FIXED LENGTH) | IDENTIFICATION INFORMATION OF PERSON (START FROM 1) (0 x 0000 INDICATES THAT THERE IS NO IDENTIFICATION INFORMATION) |
| FACE IDENTIFICATION RELIABILITY | 2 (FIXED LENGTH) | RELIABILITY OF IDENTIFICATION INFORMATION OF PERSON |
| TEXT INFORMATION SIZE | 1 (FIXED LENGTH) | TEXT INFORMATION SIZE (Byte) |
| TEXT INFORMATION | 0 TO 255 (VARIABLE LENGTH) | TEXT INFORMATION NULL-TERMINATED (MAXIMUM 255 CHARACTERS) |
| Reserved | (VARIABLE LENGTH) | RESERVED REGION |

FIG. 6

(a) BEHAVIOR ID

| ID | TYPE OF BEHAVIOR |
|---|---|
| 0 | NO BEHAVIOR INFORMATION |
| 1 | BEING ACTIVE |
| 2 | ENTERING ROOM |
| 3 | WALKING |
| 4 | SITTING |
| 5 | STANDING |
| 6 | WAKING UP |
| 7 | SLEEPING |
| 8 | FALLING DOWN |
| 9 | BEING PAINFUL |
| 10 | LEAVING |
| 11 | SMILING |
| 12 | WEEPING |
| 13 | DRINKING WATER |
| 14 | TAKING MEDICINE |
| 15 | GOING TO BATHROOM |
| ...... | Reserved |
| 255 | EXTENSION FLAG |

(b) FRAME RATE ID

| ID | TYPE OF FRAME RATE |
|---|---|
| 0 | NO FRAME RATE INFORMATION |
| 1 | 1 |
| 2 | 5 |
| 3 | 10 |
| 4 | 15 |
| 5 | 20 |
| 6 | 24 |
| 7 | 30 |
| 8 | 60 |
| 9 | 120 |
| 10 | 150 |
| 11 | 180 |
| 12 | 29.97 |
| 13 | 59.94 |
| ...... | Reserved |
| 255 | |

FIG. 11

| FIELD NAME | SIZE (Byte) | CONTENT |
|---|---|---|
| BLOCK ID | 3 (FIXED LENGTH) | BLOCK ID (START FROM 0) |
| BLOCK PRIORITY | 1 (FIXED LENGTH) | PRIORITY OF BEHAVIOR INFORMATION (START FROM 1) (0xFF INDICATES EMERGENCY DATA) |
| BEHAVIOR ID | 1 (FIXED LENGTH) | ID WHICH INDICATES BEHAVIOR (0: NO BEHAVIOR INFORMATION, 255: EXTENSION FLAG) |
| STARTING TIME | 4 (FIXED LENGTH) | FRAME AT WHICH ONE BEHAVIOR IS STARTED (frame) |
| BEHAVIOR TIME | 4 (FIXED LENGTH) | THE NUMBER OF FRAMES DURING WHICH ONE BEHAVIOR IS BEING PERFORMED (frame) |
| FRAME RATE ID | 1 (FIXED LENGTH) | ID WHICH INDICATES FRAME RATE OF VIDEO (0: NO FRAME RATE INFORMATION) |
| ADDITIONAL INFORMATION SIZE | 2 (FIXED LENGTH) | ADDITIONAL INFORMATION SIZE (Byte) |
| ADDITIONAL INFORMATION | 0 TO 65535 (VARIABLE LENGTH) | ADDITIONAL INFORMATION |

| FIELD NAME | SIZE (Byte) | CONTENT |
|---|---|---|
| BEHAVIOR RELIABILITY | 2 (FIXED LENGTH) | RELIABILITY OF BEHAVIOR INDICATED BY BEHAVIOR ID |
| FACE IDENTIFICATION ID | 2 (FIXED LENGTH) | IDENTIFICATION INFORMATION OF PERSON (START FROM 1) (0x0000 INDICATES THAT THERE IS NO IDENTIFICATION INFORMATION) |
| FACE IDENTIFICATION RELIABILITY | 2 (FIXED LENGTH) | RELIABILITY OF IDENTIFICATION INFORMATION OF PERSON |
| TEXT INFORMATION SIZE | 1 (FIXED LENGTH) | TEXT INFORMATION SIZE (Byte) |
| TEXT INFORMATION | 0 TO 255 (VARIABLE LENGTH) | TEXT INFORMATION NULL-TERMINATED (MAXIMUM 255 CHARACTERS) |
| THE NUMBER OF VIDEOS | 1 (FIXED LENGTH) | THE NUMBER OF CORRESPONDING VIDEO BLOCK IDs |
| VIDEO BLOCK ID (VARIABLE LENGTH) | 3 (FIXED LENGTH) | VIDEO BLOCK ID 1 |
| | ...... | ...... |
| | 3 (FIXED LENGTH) | VIDEO BLOCK ID n |
| Reserved | (VARIABLE LENGTH) | RESERVED REGION |

FIG. 12

STRUCTURE OF VIDEO (STILL IMAGE) DATA

| FIELD NAME | SIZE (Byte) | CONTENT |
|---|---|---|
| BLOCK ID | 3 (FIXED LENGTH) | BLOCK ID (START FROM 0) |
| VIDEO DATA FLAG | 1 (FIXED LENGTH) | 0 x 00 (0 x 00 INDICATES VIDEO DATA) |
| CORRESPONDING ID | 3 (FIXED LENGTH) | BLOCK ID OF CORRESPONDING METADATA |
| CODEC ID | 1 (FIXED LENGTH) | CODEC INFORMATION ID OF VIDEO DATA (0: NO CODEC INFORMATION) |
| DATA SIZE | 4 (FIXED LENGTH) | SIZE OF VIDEO DATA (Byte) |
| VIDEO DATA | 0 TO 4G (VARIABLE LENGTH) | VIDEO BINARY DATA |

FIG. 13

CODEC ID

| ID | TYPE OF CODEC |
|---|---|
| 0 | NO CODEC INFORMATION |
| 1 | Bitmap |
| 2 | GIF |
| 3 | JPEG |
| 4 | JPEG2000 |
| 5 | PNG |
| 6 | TIFF |
| 7 | PBM/PPM |
| 8 | MPEG |
| 9 | AVI |
| 10 | WMV |
| 11 | MOV |
| 12 | MP4 |
| 13 | 3GP/3GPP2 |
| ⋮ 255 | Reserved |

RECOGNITION DATA TRANSMISSION DEVICE

TECHNICAL FIELD

The present invention relates to a technique for transmitting recognition data.

BACKGROUND ART

Equipment and a method for recognizing a behavior of a person or the like by using various sensors have been proposed. Such equipment and method are, for example, used for managing a presence/absence of a person in a room or whether a person enters or leaves the room and watching a person from a remote place.

Proposed is a remote watching system which is easy to be installed and inexpensive by performing control in such a manner that an image of an inside of a home, which is captured by a camera, is transmitted to a server device via a telephone line and the Internet, and a cellular phone receives the image and a control command including a capturing operation of the camera from the server device (refer to PTL 1 below).

Moreover, proposed is an image processor in which a face included in a video content is detected, a feature related to the face is recorded in a content management file, the feature recorded in the content management file is compared with a feature related to a specific face, and a content including the specific face is used promptly (refer to PTL 2 below).

CITATION LIST

Patent Literature

PTL 1: Japanese Unexamined Patent Application Publication No. 2005-318445
PTL 2: Japanese Unexamined Patent Application Publication No. 2010-39724

SUMMARY OF INVENTION

Technical Problem

However, a person detection system described in PTL 1 starts capturing a person in a case where the person is detected by a human body sensor, and transmits a video to a transmission destination. On the other hand, a watching side is able to watch a behavior of the person continuously, but the watching person is required to decide, by himself/herself, whether the captured person is doing something danger or being in safety, for example. Therefore, there is a problem that the watching side is required to view the person in the transmitted video at all times. In addition, since transmitted data is video data, there is a problem that privacy of the person captured by the camera is not protected. Furthermore, an amount of data to be transferred becomes enormous, so that it is necessary to extend a transmission band for the data.

In PTL 2, though it is possible to record a face detected from a video content and a feature thereof and to perform a search, it is difficult to detect a behavior of a person in the video and record information thereof. In addition, since the person and feature data thereof, which are detected from the video content, are recorded in each representative thumbnail which is created at fixed intervals, detection data of the same person is recorded repeatedly, so that there is a problem that detection information increases. Further, since there is a case where a plurality of representative thumbnails are recorded within one behavior time of the detected person, a relation among pieces of the recorded detection information is unclear, so that it is difficult to make a connection between the recorded detection information and the behavior of the person.

The invention is made in view of such problems, and provides a recognition data transmission device which detects a person detected from a video and a behavior of the person and transmits information about the person and behavior in a unit of a behavior of the person to thereby achieve both of improvement in convenience for a watching side and reduction in transmission data.

Solution to Problem

According to one aspect of the invention, provided is a recognition data transmission device, including: at least one image capturing unit; a person detection unit that detects a feature of a person from a video captured by the image capturing unit and specifies the person in the video from the detected feature; a user information detection unit that detects user information indicating physical features of the person from the feature related to the person, which is detected by the person detection unit; a motion detection unit that detects a motion (a motion or a gesture with a body and hands) of a user from the user information output by the user information detection unit and the video captured by the image capturing unit; a behavior recognition unit that recognizes a behavior including the motion of the person from motion information output by the motion detection unit and the user information; a data conversion unit that divides recognition information, which is output by the behavior recognition unit, for each behavior of the person on a time axis, and generates divided block data; and a transmission control unit that performs control for transmitting the block data, which is output by the data conversion unit, to an outside as recognition data for each block.

For example, the user information is detected by comparing the detected feature with data of an information DB, which is registered in advance as a feature of the person. Moreover, the behavior of the person is detected by comparing the behavior with data of the information DB, which is registered in advance as motion information.

According to the invention, a person detected from a video and a behavior thereof are detected and information thereof is transmitted in a unit of a behavior of the person, thereby achieving both of improvement in convenience for a watching side and reduction in transmission data.

The present specification includes the content in its entirety described in the specification and/or the drawings of Japanese Patent Application No. 2013-260425 which is the base of the priority of the present application.

Advantageous Effects of Invention

According to the invention, by detecting a person detected from a video and a behavior thereof and transmitting information thereof in a unit of a behavior of the person, it is possible to achieve both of improvement in convenience for a watching side and reduction in transmission data.

BRIEF DESCRIPTION OF DRAWINGS

FIG. 5 is an illustration of an example of behavior information transmitted in blocks.

FIG. 6 is an illustration of an example of a behavior ID and a frame rate ID which are included in the behavior information.

FIG. 11 is an illustration of an example of information indicating the video data corresponding to behavior information in a case of abnormality in the recognition data transmission device according to the third embodiment of the invention.

FIG. 12 is an illustration of an example of a video data structure, which is transmitted in blocks, in the recognition data transmission device according to the third embodiment of the invention.

FIG. 13 is an illustration of types of codecs in the recognition data transmission device according to the third embodiment of the invention.

DESCRIPTION OF EMBODIMENTS

Hereinafter, embodiments of the invention will be described in detail with reference to drawings.

First Embodiment

The present embodiment relates to an image processing device, an image capturing device, an image processing method, and a program which are used for security purpose such as watching a person, taking care of a child, monitoring an intruder, prevention of crimes, and security and safety, or used for controlling a household electrical appliance by using a sensor which recognizes a position or a behavior of a person in a room and notifying a person in a remote place of information acquired by the sensor. Examples thereof include a behavior recording device, a behavior reproducing device, a behavior detection image capturing device, and the like.

[Watching System]

Figure 1:
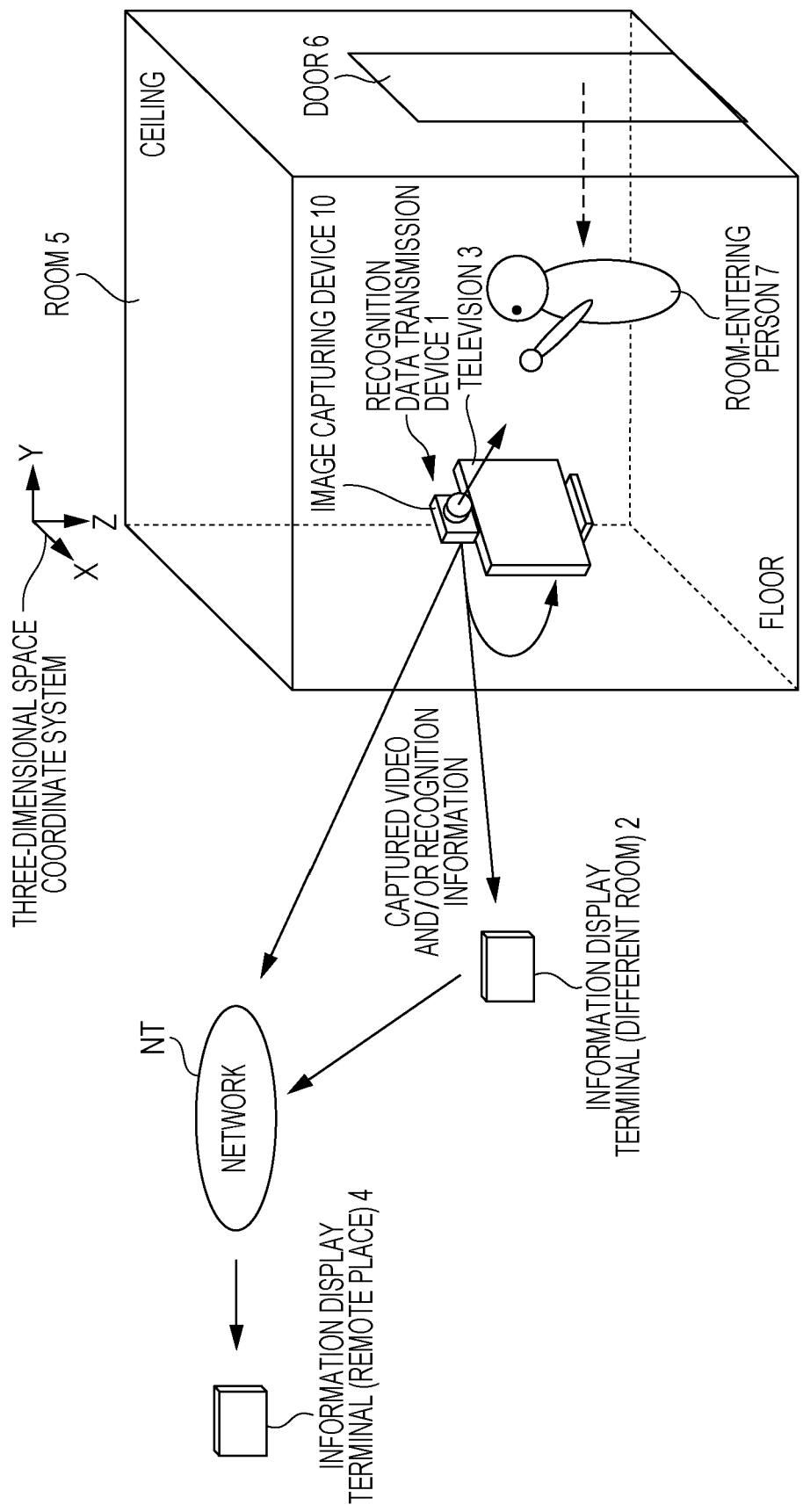
FIG. 1 is an illustration of a configuration example of an external appearance of a monitoring system (watching system) using a technique for transmitting recognition data according to a first embodiment of the invention.

FIG. 1 is a conceptual diagram of a watching system using a recognition data transmission device according to a first embodiment of the invention.

As illustrated in FIG. 1, a recognition data transmission device 1 detects feature data and behavior information of a room-entering person 7 detected by an image capturing device 10 and from a captured video, and transmits the behavior information to the outside. As an example of an installation position, FIG. 1 illustrates an example in which the recognition data transmission device 1 including the image capturing device 10 is installed on top of a television 3. The television 3 is installed in a corner of a room so that the entirety of a room 5 is able to be captured by the image capturing device 10 for recognition data. In addition, the television 3 is installed in a corner on a side opposite to a door 6 so that the room-entering person 7 who enters from the door 6 is able to be captured reliably.

The recognition data transmission device 1 captures the room-entering person 7 and, from the captured video, detects a person and detects information on who the person is and what behavior the person is having (hereinafter, referred to as "behavior information").

Note that, the installation position of the recognition data transmission device 1 is not limited and may be any position as long as being a position from which the entirety of the room 5 is able to be seen and a view-angle of a captured video includes the room-entering person 7 reliably. For example, the installation position may be on the ceiling, inside lighting, inside an air conditioner installed on a wall surface in a room, or the like.

Next, the behavior information detected by the recognition data transmission device 1 is displayed on an information display terminal 2 which is in a room different from the room 5 but in the same building by using local network (LAN) such as Wi-Fi, Ethernet (registered trademark), or Bluetooth (registered trademark). As information to be displayed, the detected behavior information may be displayed with characters or an illustration, or may be converted into audio data by the information display terminal to be output as the audio data. Moreover, in the case of urgent behavior information such as at a time of abnormality, the behavior information may be output to the information display terminal 2 with a flash, an alarm, vibrations, or the like to notify a watching person side. Though data to be transmitted to the information display terminal 2 is the behavior information here, the video captured by the image capturing device 10 of the recognition data transmission device 1 may be transmitted. Particularly in the urgent case such as at the time of abnormality, by transmitting video data with the behavior information, the watching person is able to instantly check a condition or confirm safety of the room-entering person 7.

Similarly, behavior data or the captured video detected by the recognition data transmission device 1 may be transmitted to an information display terminal 4 in a remote place by using an optical line, an ADSL, or a wireless communication system for a cellular phone (third or fourth generation mobile communication system) to make a connection with the Internet. Thereby, it becomes possible to notify a watching person in the remote place of watching information output to the information display terminal 2.

Note that, by displaying a video of the recognition data transmission device 1 on the information display terminal 2 or 4 and displaying a video of a built-in camera in the information display terminal 2 or 4 on the television 3 via the recognition data transmission device 1, it is also possible to realize a video telephone. Though an example in which the video of the recognition data transmission device 1 is displayed on the television 3 is described here, there is no limitation thereto, and the video may be displayed on a display device (for example, a smartphone, a tablet terminal, a PC, or the like) in the room.

[Transmission of Behavior Information]

Figure 2:
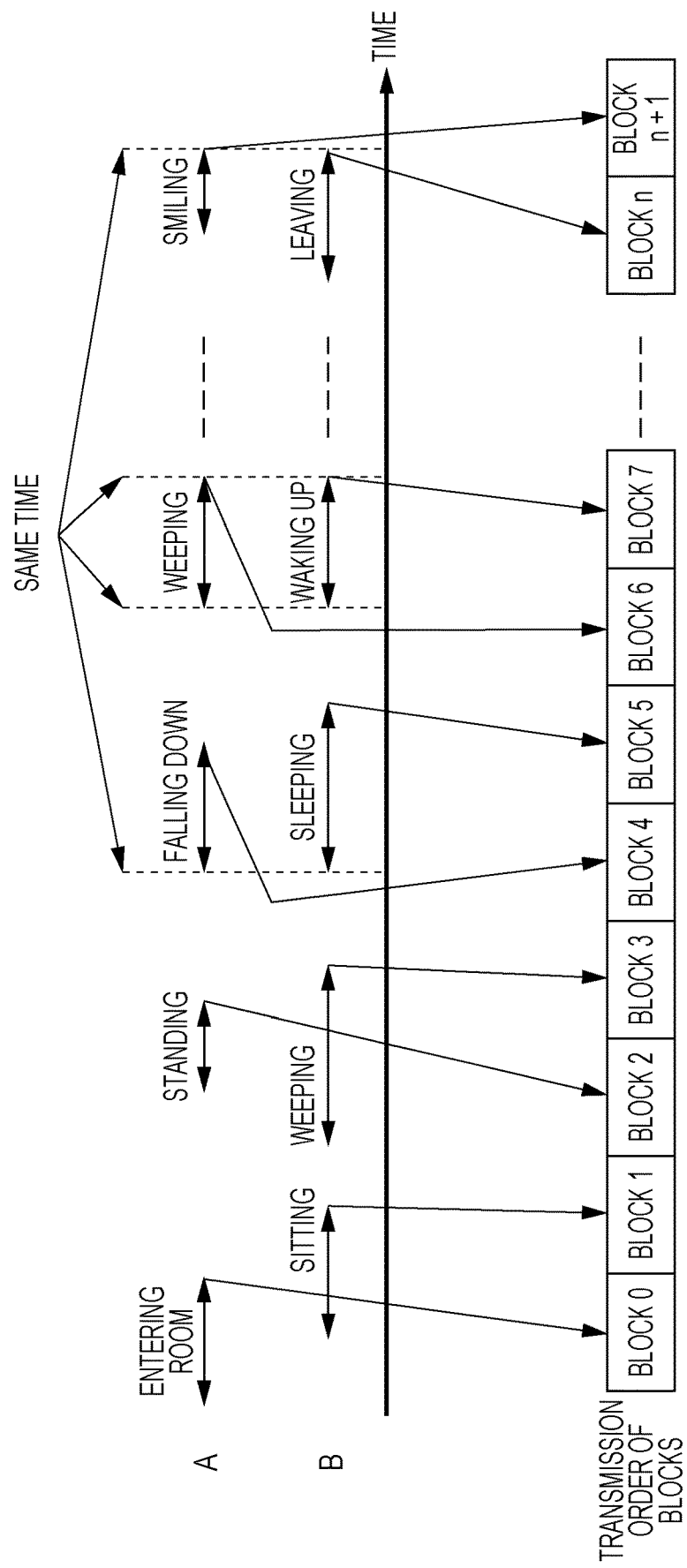
FIG. 2 is an illustration of an example of transmission of behavior information used for the technique for transmitting recognition data according to the first embodiment of the invention.

FIG. 2 is an illustration of a transmission example of behavior information detected by the recognition data transmission device 1. Illustrated is a case where the number of persons whose behavior is detected is two of A and B. In FIG. 2, time elapse is represented from the left toward the right. It is indicated that the person A had a behavior of "entering a room" first, and had a behavior of "standing" after the behavior of "entering a room" had been finished and a fixed time had elapsed. Here, each arrow in a right and left direction in the figure represents an elapsed time required for a corresponding behavior. In this manner, in FIG. 2, behaviors of the persons A and B are indicated in time series with elapsed times.

There are a few cases where a behavior of a person occurs only in a certain moment, and there is generally an elapsed time from a start to an end of the behavior. In the case of watching, the behavior information is not necessarily notified frame by frame which is a minimum unit of the video, and the behavior information only needs to be notified for each behavior. Accordingly, the behavior information regarding, for example, the behavior of "standing" may be transmitted as to when the behavior was started and about how long an elapsed time thereof was. Moreover, when the behavior information is transmitted in a unit of a frame, a relation among pieces of behavior information detected in frames is unclear, so that information to maintain the relation is required to be added, resulting in that transmission data increases.

Then, the present embodiment is characterized in that, as to one behavior, transmission is performed in a minimum unit of behavior information, which is from a start to an end of the behavior. Moreover, in a case where the behavior information and a video thereof are transmitted together, as to the behavior information and video data, a video corresponding to the behavior is able to be searched for merely by referring to a starting time and a finishing time of the behavior.

The aforementioned minimum unit of the behavior information is to be referred to as a block. FIG. 2 illustrates that the person A started the behavior of "entering a room" first, and, during the behavior of "entering a room", the person B started a behavior of "sitting". As to a transmission order of the behavior information, the behavior information related to the behavior of "entering a room" of the person A, which was performed first, is stored in a block 0 to perform transmission. Next, the behavior information of "sitting" performed by the person B is set as a block 1 to perform transmission after the transmission of the block 0. In this manner, a behavior of the detected person is detected as one piece of behavior information for each behavior, and the piece of behavior information is transmitted as one block in order of occurrence of the behavior. By transmitting one behavior as one piece of behavior information in a unit of a block, it is possible to substantially reduce transmission data compared with a case where information on a detected face or the like is transmitted for each video frame.

As described above, since time elapses with respect to one behavior of a person, while a certain behavior is performed, a different behavior is performed by a different person in some cases. Examples of such case include a case where, after the person B in FIG. 2 starts "weeping", the person A starts "standing", and the behavior of "standing" of the person A is finished before "weeping" of the person B is finished. In this case, if transmission of the behavior information is started at a time point when the person B starts the behavior of "weeping", it becomes impossible to transmit the behavior information of "standing" of the person A until the behavior of "weeping" is finished. Accordingly, in the present embodiment, by setting a time point when a behavior is finished as a reference to recognize that detection of the behavior is finished, behavior information is transmitted in order of detection. With such a transmission order, the behavior of "standing" of the person A is finished earlier than the behavior of "weeping" of the person B when both the behaviors are compared, and is therefore transmitted as a block 2 earlier than a block 3 of the behavior information of "weeping" of the person B.

Moreover, in the case of finishing at the same time like a behavior of "smiling" of the person A and a behavior of "leaving" of the person B, either may be transmitted earlier. FIG. 2 illustrates an example in which behavior information of "leaving" of the person B, the behavior of which is started earlier, is set as a block n and transmitted earlier than behavior information of "smiling" of the person A (block n+1).

As an example of the case where there are pieces of behavior information finishing at the same time as above, priority of behavior information may be set to be higher in order of earlier starting time of a behavior, and the behavior information may be transmitted in descending order of priority. For a case where there are pieces of behavior information finishing at the same time, whose starting times of behaviors are also the same, by setting a person who has a higher priority in advance in order to set a higher priority to a behavior of the person having the higher priority, the behavior information may be transmitted in descending order of priority. FIG. 2 illustrates an example in which it is set that the person A has a higher priority than the person B, and "weeping" of the person A and "waking up" of the person B are started at the same time and finished at the same time, "weeping" of the person A who has a higher priority is set as a block 6 and the block 6 is transmitted earlier than a block 7 of "waking up" of the person B.

Though the example has been described in which the behavior information is transmitted as information indicating a behavior of a person in a unit of a block, not only the behavior information but also a corresponding video or still image may be transmitted as data to be transmitted. Moreover, in order to reduce an amount of transmission data, only the behavior information may be transmitted.

[Recognition Data Transmission Device]

Figure 3:
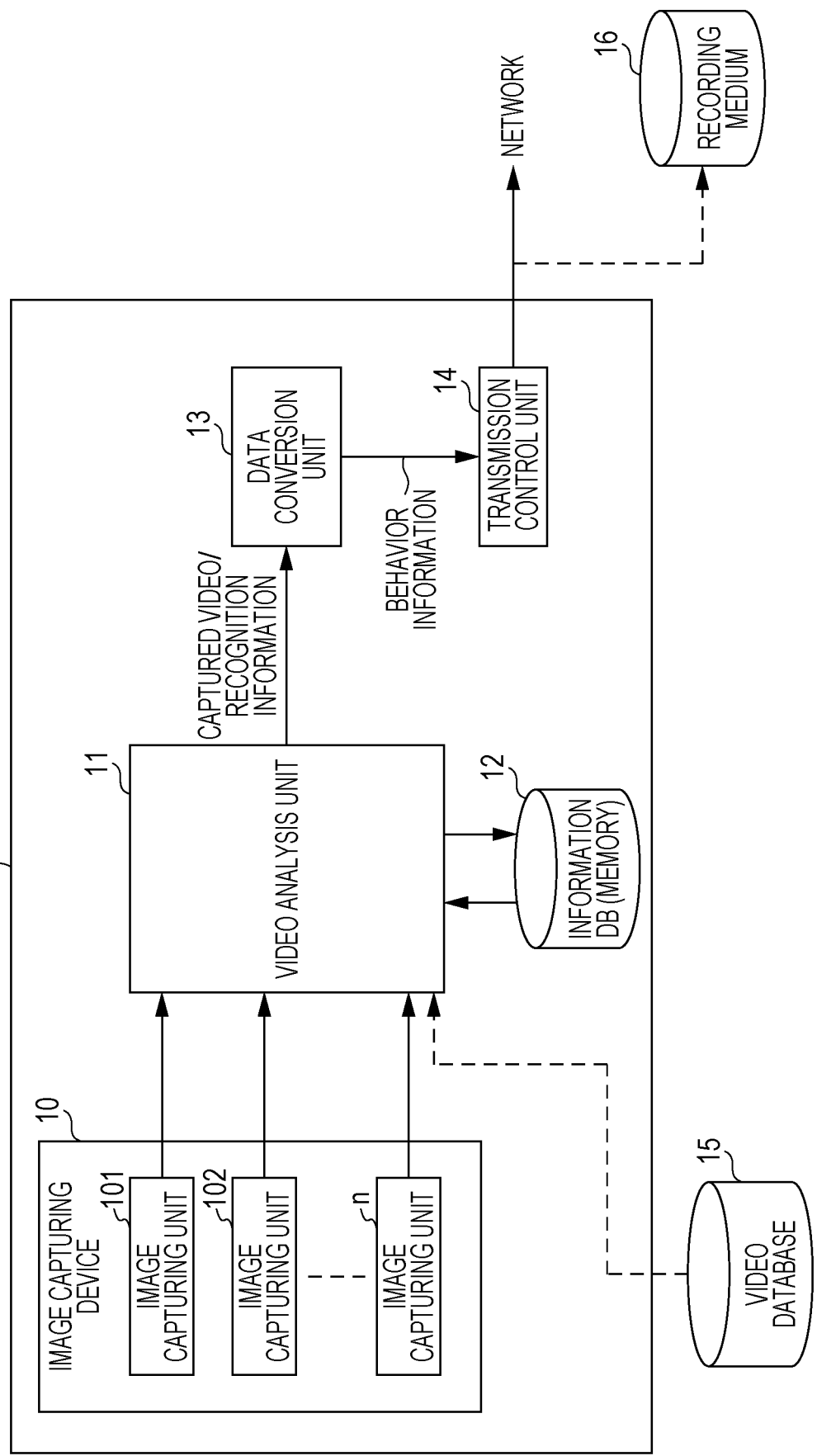
FIG. 3 is a functional block diagram illustrating a configuration example of a recognition data transmission device according to the first embodiment of the invention.

A configuration example of the recognition data transmission device according to the present embodiment will be described with reference to FIG. 3.

The recognition data transmission device 1 generates a video signal indicating a video captured by the image capturing device 10, and sends the generated video signal as video data to a video analysis unit 11. The image capturing device 10 may include one or more image capturing units (101 to n). FIG. 3 illustrates an example including n image capturing units. By providing one or more image capturing units, it becomes possible for the respective image capturing units to capture a region of the room to be captured in a shared manner, thus making it possible to capture a wider region and reduce a region (occlusion region) which is hidden by an object such as furniture. The image capturing units 101 to n are cameras each of which is provided with an optical system including a lens which condenses light, entering from an object, to a focal point and an image sensor converting the condensed light into an electric signal, for example. The image sensor provided in each of the image capturing units 101 to n is, for example, a CCD (Charge Coupled Device) element, or a CMOS (Complementary Metal Oxide Semiconductor) element. Note that, a video captured by the image capturing device 10 may be output in a wired transmission or in a wireless transmission, and may be input to the video analysis unit 11 by using any transmission method.

The video analysis unit 11 analyzes the video input from the image capturing device 10, detects or identifies a face or a person, and detects a behavior of the person. An information DB (memory) 12 stores learning information and the like such as a template of a face or an object which is required for detection or identification of a face or a person and a template of motion information which is required for detection of a behavior. In addition, the information DB (memory) 12 temporally stores intermediate data for video analysis. Furthermore, in order to allow identification of a specific person, feature data of a face and a person is stored in advance.

Alternatively, for example, the information DB (memory) 12 stores information for displaying an action to a behavior of a person on the information display terminal of the watching side at a destination of the network in accordance with recognition information detected by the video analysis unit 11.

By using an input video from the image capturing device 10 and learning data from the information DB 12, the video analysis unit 11 detects a behavior of a person in a video and outputs a detection result as recognition information. At this time, video data used for the detection of the behavior (which includes a video captured by the image capturing device 10) may be also output with corresponding recognition information.

A data conversion unit 13 performs processing of converting the recognition information and the captured video which are output from the video analysis unit 11 into blocks described above. The data conversion unit 13 sends the recognition information and the video data, which are converted into the blocks, as behavior information to a transmission control unit 14, and the transmission control unit 14 performs transmission to the outside by using the above-described transmission method such as Wi-Fi. Note that, the transmission control unit 14 may not only transmit the behavior information to a network but also record the behavior information in a recording medium 16 such as an optical disk, a semiconductor memory, or an HDD. The behavior information which is transmitted to the outside by the transmission control unit 14 may include the recognition information alone, may include the video data alone, or may include both of the behavior information and the recognition information.

In addition, a video to be input to the video analysis unit 11 may be not only the captured video from the image capturing device 10 but also a video in a video database recorded in the recording medium 16. Furthermore, the video database may be a video stored in a server connected to the Internet.

The video data to be input to the video analysis unit 11 may be not only the video data but also a detection result from various sensors such as an infrared sensor, a ranging sensor, an acceleration sensor, a gyro sensor, and an electronic compass, and the recognition information may be generated by using the detection result of these sensors.

[Video Analysis Unit]

Figure 4:
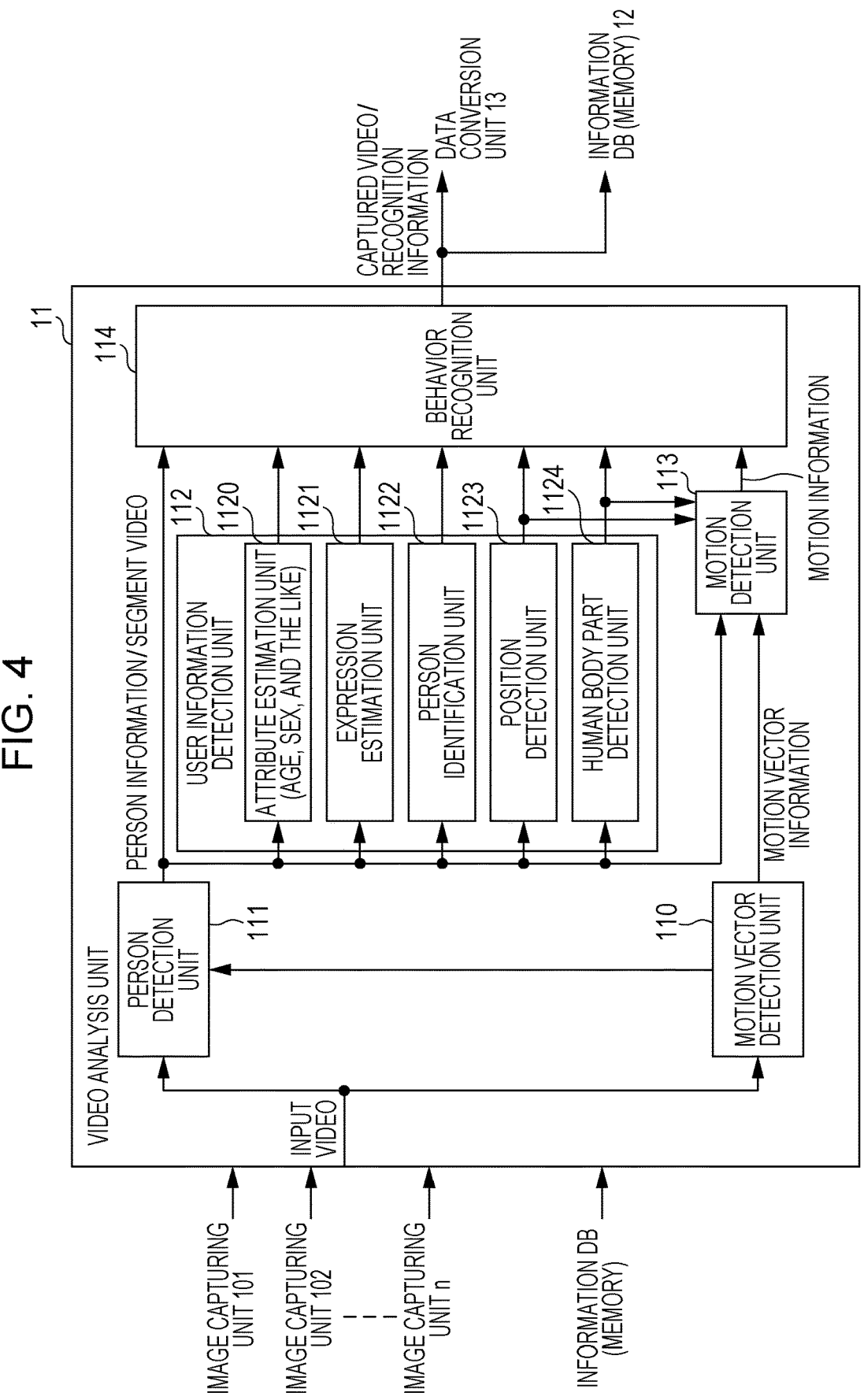
FIG. 4 is a functional block diagram illustrating a configuration example of a video analysis unit included in the recognition data transmission device.

One configuration example of the video analysis unit 11 will be described in detail by using FIG. 4.

The video analysis unit 11 combines detection of a face of a person and motion information calculated from differences in a plurality of pieces of video data, each of which is obtained by capturing at a different time, based on a video signal input from the image capturing device 10, determines that what is moving (a region in which image data changes) is a person based on a region in a video, which is detected as a face, performs detection as to whether there is a person and detection by tracking the person, and outputs a result thereof as recognition information. Moreover, based on the video signal input from the image capturing device 10, the video analysis unit 11 detects a position at which the person exists and a motion amount, identifies sex and age of the person and who the person is, and detects what behavior the detected person is performing, such as a facing direction and expression of the face, and outputs a result thereof as detection information. Further, as a behavior to be detected, information indicating a motion of the person such as a gesture is detected and output.

[Motion Vector Detection Unit]

A motion vector detection unit 110 detects a moving region in a video from a plurality of videos input from the image capturing device 10. By accumulating one or more frames of a video of one image capturing unit in a time direction, the motion vector detection unit 110 detects a region, in which a difference value between a pixel value of a present frame and a pixel value of a corresponding past frame of the same coordinates is greater than a predetermined threshold, as the moving region. The motion vector detection unit 110 inputs the detected moving region, coordinates of the center of gravity thereof, a moving amount, and a moving direction (vector) to a person detection unit 111 and a motion detection unit 113 as tracking information (moving vector information), and outputs them as the detection information at the same time.

Moreover, the motion vector detection unit 110 may detect the moving region in the video by inputting (not illustrated) person information which is output by the person detection unit 111 described below in addition to the plurality of videos input from the image capturing device 10. In a case where the moving region detected by the motion vector detection unit 110 is in a range (region) of a threshold, which is predetermined based on position information included in the person information output by the person detection unit 111, it may be determined that the person has moved, and the detected moving region, the coordinates of the center of gravity thereof, the moving amount, and the moving direction (vector) may be input to the motion detection unit 113 as the tracking information (moving vector information) of the person, and may be output as the detection information at the same time. In this manner, by combining information on the detected moving region and the person information, it is possible to prevent motion vector information of an object or the like other than the person from being detected, thus making it possible to extract and output motion vector information of the person who is a target of watching.

Note that, a method of detecting the motion information by the motion vector detection unit 110 is not limited to the method described above, and any method may be used such as a method of searching for, in a unit of a region (macro-block) in which, for example, the numbers of pixels in a vertical direction and a horizontal direction are 8×8 or 16×16, a position of a region in a past frame, which coincides with the macro-block of a present frame, and, in the case of finding the position, setting a moving amount of coordinates thereof as a motion amount.

[Person Detection Unit]

The person detection unit 111 detects a region showing an image of a face from the plurality of videos input from the image capturing device 10 and the motion vector information input from the motion vector detection unit 110. The person detection unit 111 generates two-dimensional face region information indicating two-dimensional coordinates of a representative point (for example, a center-of-gravity point) in the detected face region or two-dimensional coordinates of an upper end, a lower end, a left end, and a right end of the region. The person detection unit 111 combines the above-described two-dimensional coordinates which are generated from a plurality of images captured by the plurality of image capturing units, converts the resultant into three-dimensional coordinates of a three-dimensional space coordinate system in a room, and generates three-dimensional face position information. In a case where the face is successfully detected here, it is determined that the person entered the room.

In order to detect a face region, the person detection unit 111 extracts a pixel, for example, in a range of a color signal value indicating a hue of a face (for example, a skin color), which is set in advance, from an image signal which is input.

Note that, the person detection unit 111 may be provided with a storage unit which stores therein a grayscale (monochrome) image signal, which indicates a human face, in advance. The person detection unit 111 then calculates a correlation value of the grayscale image signal read from the storage unit and the input image signal for each image block including a plurality of pixels, and detects an image block, the calculated correlation value of which is greater than a predetermined threshold, as the face region.

Alternatively, the person detection unit 111 may calculate a feature (for example, a Haar-like features) based on the input image signal, and perform predetermined processing (for example, an AdaBoost algorithm) based on the calculated feature to detect the face region. The method of detecting the face region by the person detection unit 111 is not limited to the above-described methods, and any method may be used as long as being a method of detecting the face region from the input image signal.

In addition, since a face is not always captured even in a case where there is a person captured in a video, it may be determined that there is a person in a moving region by using the motion vector information input from the motion vector detection unit 110. Further, a person may be detected by combining face region information and a motion vector. By tracking the detected person, while collating the motion vector information and the face region information, and improving accuracy of person detection and specifying a face detection range in the next frame, it is possible to reduce a calculation amount.

The methods of detecting a face in images have been described above, and a face in images is detected by extracting, from the images, a feature of other information related to the face such as, for example, sex of the face, age, a facing direction of the face, expression of the face such as smiling, being angry, weeping, or the like to register the feature. Moreover, the facing direction of the face is detected by similarly extracting a feature from face images in which the face faces in a various directions such as upward, downward, or sideways to register the feature. Further, the person detection unit 111 may extract a feature from a face image of a specific person in advance, register the feature, and collate an input face image and the registered feature by using the aforementioned algorithm to thereby identify which registered person the input face image indicates.

Such information related to a face, which is detected by the person detection unit 111, is input to a user information detection unit 112, the motion detection unit 113, and a behavior recognition unit 114 as person information, and output as the detection information at the same time.

Furthermore, in addition to the detected person information, the person detection unit ill may output videos captured by the image capturing device 10, a segment video obtained by segmenting a face region or a person region corresponding to the person information detected from the captured videos, or a captured video corresponding to the person information among the videos captured by the image capturing device 10 to the user information detection unit 112, the motion detection unit 113, and the behavior recognition unit 114.

[User Information Detection Unit]

Next, a configuration of the user information detection unit 112 will be described. Based on the person information detected by the person detection unit 111, an attribute estimation unit 1120 performs comparison with data in the information DB, which is registered in advance as a feature of a person, and thereby estimates age and sex of the detected person information. An expression estimation unit 1121 estimates expression of a person such as smiling, weeping, and being angry. A person identification unit 1122 performs comparison with a feature of a part of a face of the person who is registered in the information DB in advance, checks if there is a registered person coinciding with him/her, and identifies the person in video data. When there is a registered person coinciding with him/her, a name of the person is output and, when there is no registered person coinciding with him/her, an identification result is output as an unknown person. A position detection unit 1123 outputs a position of the person in the video. A human body part detection unit 1124 detects parts of a human body of the detected person, such as a head, an arm, a hand, a foot, and a trunk, and outputs position information in the video and sizes thereof.

[Motion Detection Unit]

The motion detection unit 113 detects a motion of the detected person, such as a movement or a behavior, from the plurality of videos input from the image capturing device 10, the person information input from the person detection unit 111, and the tracking information (motion vector information) input from the motion vector detection unit 110. In a case where a coordinate position of a face in the three-dimensional space coordinate system, which is input from the person detection unit ill, is at a position higher than a predetermined threshold, it is determined to be standing. Further, by registering height information in the information DB in advance with the identification information of the registered person and setting a range of the three-dimensional coordinates of a face, by which determination to be standing is made, based on the identification information output from the person detection unit 111 and the height information, it is possible to determine that the person is standing with higher accuracy. Next, similarly, when the three-dimensional coordinates of the face is closer to a floor side than a threshold predetermined with respect to the floor, it is determined to be sleeping (or falling down). In a case where a bed or the like is installed, the determination as to whether to be sleeping is similarly made with a height of the bed added to the above-described threshold. A state other than these standing and sleeping states is determined to be sitting. The motion detection unit 113 outputs these determination results as motion information.

In the case of detecting that a person exists in a room and is moving from the person information received from the person detection unit 111, the tracking information of the motion vector detection unit 110, person position information of the position detection unit 1123, and human body part information of the human body part detection unit 1124, the motion detection unit 113 determines that the detected person is waking. Furthermore, in a case where the waking person is suddenly brought into a sleeping state or does not move in the sleeping state for a while, since it is estimated that his/her physical condition has suddenly changed, information indicating being falling down is output as the motion information.

In addition, the motion detection unit 113 detects a motion of a hand or a foot of a person from the person information received from the person detection unit 111, the tracking information of the motion vector detection unit 110, the person position information of the position detection unit 1123, and the human body part information of the human body part detection unit 1124, detects jumping or the like from a change in the three-dimensional coordinates of the face, and detects a shape of a body and a gesture such as a motion, which are predetermined. Then, the detected gesture information is output as the motion information.

Note that, the methods of detecting a behavior of a person, which have been described above, are not limited thereto, and, in addition to the detection by using one of the methods, a behavior or a motion of a person may be detected by combining some of the methods.

[Behavior Recognition Unit]

The behavior recognition unit 114 detects a behavior of an entering person from detection of presence or absence of a person in a room and a tracking result thereof, an identification result as to who the entering person is, a result of motion detection of the person in the room, which are the detection information input from the user information detection unit 112, and information in the information DB 12, and records the behavior in the information DB 12. As a behavior to be detected, detected is whether the entering person is standing, sitting, or sleeping, at which position in the room he/she exists, in which direction he/she faces, or the like. By detecting the position of the entering person and the direction in which the person faces, it is possible to detect that he/she is, for example, watching TV, cooking, eating, and the like.

Furthermore, in addition to recording the information of the detected behavior in the information DB 12, a detection result thereof may be displayed on a display such as a television, for example. As the detection result, current detection information may be displayed in real time, or past data may be displayed.

The behavior recognition unit 114 may transmit the detected behavior information to a watching side via a network. The behavior information to be transmitted may be transmitted to, displayed on, or recorded in a display (for example, a television, a cellular phone, a portable terminal, or a dedicated display) of the watching side. In addition, the detected behavior information may be once stored in a server which exists on the network, and the watching side may read the detected behavior information as necessary and display it on the display.

Further, from detection information of a person who enters a room, for example, in the case of a child, the behavior recognition unit 114 is able to prevent locking in or a drowning accident by detecting a child entering a bathing room or a room where a washing machine is installed. It is also possible to prevent a fire from occurring due to mischief by a child to a cooking stove in the kitchen or a heater, thus making it possible to use for monitoring for security in a room. Moreover, by detecting an entering person who is not registered in the information DB 12, it is possible to detect a thief or the like.

In addition to such control, the behavior recognition unit 114 automatically recognizes, for example, a predetermined gesture or a predetermined behavior of a person, and performs an operation on corresponding equipment 1 to m. The behavior recognition unit 114 collates the detection information input from the user information detection unit 112 and the information in the information DB 12, searches for a designation of predetermined equipment and a control command of the designated equipment, and transmits the control command to the corresponding equipment.

The behavior recognition unit 114 may output, as a captured video, the videos captured by the image capturing device 10, the segment video obtained by segmenting the face region or the person region corresponding to the person information detected from the captured videos, or a captured video corresponding to the person information among the videos captured by the image capturing device 10, which is input from the person detection unit 111, the user information detection unit 112, and the motion detection unit 113, to the data conversion unit 13 and the information DB 12 with the recognition information including the behavior information.

[Behavior Information]

A detailed example of behavior information to be transmitted in a block will be described with reference to FIG. 5.

FIG. 5 is an illustration in which an order and contents of data to be stored from a head of one block are described. The data to be stored in the block is binary-format data in accordance with a format of FIG. 5. Each information to be stored (hereinafter, a field) in the block is recorded in order of a block ID, block priority, a behavior ID, a starting time, a behavior time, a frame rate ID, an additional information size, and additional information, from the head. Description thereof will be given below.

(Block ID)

The block ID in a first field is a specific ID which is added for each block, and stored in order from 0 with respect to a block to be transmitted. A recording region of the block ID has a fixed length of 3 bytes, and stores therein a value from 0 to 0xFFFFFF. For example, "0" is stored as a block ID of the block 0 which stores therein the behavior information of "entering a room" which is the first behavior of A in FIG. 2.

(Block Priority)

In the block priority in a second field, priority of detected behavior information is stored. The higher priority indicates a behavior which is performed (finished) earlier (at an earlier time), and urgent and important behavior information, such as "falling down". A recording region of the block priority has a fixed length of 1 byte, and stores therein a value from 1 to 0xFF. The value of 1 indicates the lowest priority, and as the value increases, it is indicated that the priority becomes higher. In addition, 0xFF indicates emergency data (highest priority).

(Behavior ID)

The behavior ID in a third field is an ID indicating a content of a detected behavior. A recording region of the behavior ID has a fixed length of 1 byte, and stores therein an ID corresponding to a type of a behavior as illustrated with behavior IDs in FIG. 6(*a*). The behavior ID stores IDs of the types of the behaviors corresponding to the behavior information recognized by the video analysis unit 11. For example, in the case of "entering a room" which is the first behavior of A of FIG. 2, an ID 2 is stored.

In a case where there is no person in a captured video of the image capturing unit 101, or in a case where, even there is a person, he/she does not particularly move, an ID 0 of "no behavior information" is stored. A case where "no behavior information" is stored and transmitted regardless of no particular movement means a case where a person is detected in a captured video of the image capturing unit 101, and it is desired to transmit additional information as to who the person is, a detected face, reliability of a behavior, and the like, for example. It may be set that a definition is able to be added to the behavior IDs later in addition to the behaviors of 0 to 15 indicated in FIG. 6(*a*). Therefore, behavior IDs 16 to 254 are secured as reserved regions. In the case of adding behavior information later, one of the behavior IDs 16 to 254 is used, and a new type of a behavior is defined.

Moreover, storing a value of 255 as the behavior ID means an "extension flag". The "extension flag" is used for extension in a case where all of the behavior IDs 0 to 254 are used for the types of behaviors, and provided to be able to define an additional type of a behavior in the reserved region of additional information, which will be described below, when 255 is stored in the behavior ID.

(Starting Time)

The starting time in a fourth field stores therein information indicating a time when a behavior indicated with a behavior ID is started. A recording region of the starting time has a fixed length of 4 bytes, and, in the case of transmitting video data obtained by capturing by the image capturing unit 101 and behavior information recognized from the video data, stores therein a frame number from the start of the capturing. By storing the frame number corresponding to the captured video from the start of watching, it is possible to immediately search for a video corresponding to a recognized behavior.

In the case of transmitting behavior information, for example, in order to reduce an amount of transmission data or when a system does not require video data, time (time period) information may be stored.

(Behavior Time) The behavior time in a fifth field stores therein information indicating an elapsed time spent for a behavior indicated with a behavior ID. A recording region of the behavior time has a fixed length of 4 bytes, and, in the case of transmitting the video data obtained by capturing by the image capturing unit 101 and the behavior information recognized from the video data, stores therein the number of frames from the start of the behavior (frame number indicated by the field of the starting time). By storing the number of frames corresponding to the captured video from the start of watching, it is possible to immediately search for a video corresponding to the elapsed time of a recognized behavior (behavior time).

In the case of transmitting behavior information, for example, in order to reduce an amount of transmission data or when a system does not require video data, the elapsed time spent for the behavior may be stored.

Though storing information of an elapsed time of a behavior has been described, a frame number or time (time period) information at a time when the behavior is finished may be stored. In this case, it is possible to calculate the elapsed time of the behavior from a difference between the above-described starting time and the stored behavior finishing time.

(Frame Rate ID)

The frame rate ID in a sixth field stores therein information indicating a frame rate of the video data obtained by capturing by the image capturing unit 101. A recording region of the frame rate ID has a fixed length of 1 byte, and stores therein an ID corresponding to a type of a frame rate indicated in FIG. 6(*b*). For example, in a case where the video data has sixty frames per second, an ID value of 8 is stored. Though the types of the frame rates 0 to 13 are indicated in FIG. 6(*b*), not only these types of the frame rates but also other frame rates may be included. Thus, in order to be able to add a frame rate later, IDs 14 to 255 are secured as reserved regions. In a case where addition of a frame rate occurs, additional definition may be given to one of the IDs 14 to 255.

The frame rate ID is used, when the frame number and the number of frames of a video corresponding to information indicated by the starting time or the behavior time are stored therein, for calculating the behavior starting time (time period) or the elapsed time of the behavior from the frame number and the number of frames. For example, in a case where, when the frame ID is 8 (video having sixty frames per second), the starting time is 600th (frame), it is indicated that a behavior had been started ten seconds after the start of the capturing. Moreover, in a case where the behavior time is 3600 (frames), it is indicated that the behavior had been being performed for sixty seconds from the start of the behavior.

In a case where the frame rate ID has a value of 0 (no frame rate information), it is indicated that there is no frame rate information. This is used, for example, in a case where recognized behavior information is transmitted and corresponding video data is not transmitted. In this case, since conversion into time (time period) information is not able to be performed even when the frame number or the number of frames is stored in the starting time or the behavior time, the time (time period) information is to be stored in the fields of the starting time and the behavior time. Accordingly, in the case of having the value of 0, the frame rate ID is able to be used as flag information by which information stored in the starting time and the behavior time is determined to be the time (time period) information.

(Additional Information)

The additional information size in a seventh field and the additional information in an eighth field store therein each detection information used for determining the recognition information output by the video analysis unit 11. A recording region of the additional information has a variable length from 0 to 65535 bytes, and a size of the additional information to be transmitted is stored in the additional information size. A recording region of the additional information size has a fixed length of 2 bytes, and stores therein a magnitude of the additional information size in a unit of byte.

The additional information stores therein, from a head thereof, behavior reliability, a face identification ID, face identification reliability, a text information size, and text information.

(Behavior Reliability)

The behavior reliability which is a first field of the additional information stores therein reliability with respect to a behavior recognized by the video analysis unit 11 (certainty of recognition information). A recording region of the behavior reliability has a fixed length of 2 bytes, and stores therein a value from 0 to 65535. A greater value indicates higher reliability.

(Face Identification ID)

The face identification ID which is a second field of the additional information stores therein an ID by which a person performing the behavior recognized by the video analysis unit 11 is identified. A recording region of the face identification ID has a fixed length of 2 bytes, and stores therein a value from 0 to 65535. The value of 0 indicates that there is no identification information (no identified person), and the value of 1 or more indicates identification information of a person. As the identification information, a person who is desired to be identified is registered by capturing in advance a face of the person who is desired to be identified, extracting features of the captured person at the person identification unit 1122 of the video analysis unit 11 as face information, and allocating the resultant to the identification ID. Then, features of a captured person are extracted as face information from a captured video from start of watching similarly by the person identification unit 1122, subjected to identification for checking if there is an ID coinciding therewith among the identification IDs registered in advance, and, in a case where there is a coinciding identification ID, the ID is stored in the face identification ID. In a case where there is no coinciding identification ID (a person is different from the person registered in advance), 0 is stored in the face identification ID.

(Face Identification Reliability)

The face identification reliability which is a third field of the additional information stores therein reliability with respect to the identification ID of the person identified by the person identification unit 1122 of the video analysis unit 11 (certainty of the recognition information). A recording region of the face identification reliability has a fixed length of 2 bytes, and stores therein a value from 0 to 65535. A greater value indicates higher reliability.

(Text Information)

The text information size which is a fourth field of the additional information and the text information which is a fifth field store therein character information such as description related to a transmission block, a name of a person whose face is recognized, a content of a notification corresponding to a caution or a warning against a recognized behavior, and the like. A recording region of the text information has a variable length of 0 to 255 bytes, and a size of text information to be transmitted is stored in the text information size. A recording region of the text information size has a fixed value of 1 byte, and stores therein a magnitude of a text size in a unit of byte (unit of a character).

The text information is terminated with a null character added thereto. In a case where the text information has the odd number of characters or in a case where a head of a field after the text information is not a value of an address of a multiple of 4 (alignment of 4 bytes), the text information size may be adjusted by storing a size, which is 4-byte aligned, by the text information size, and detection of the number of characters which is actually stored may be performed by searching for the null character from the head of the text information.

Moreover, information to be stored in the additional information is not limited thereto, and other detected or recognized information may be stored. Thus, a reserved region is secured as a region having a variable length so as to add additional information later thereto. When there are 256 or more types of behaviors of FIG. 6(*a*) described above, the extension flag of the ID 255 is used, and information of a type of a behavior and the like is stored in the reserved region. Though the reserved region has a size having a variable length, since a size of the entire additional information is stored in the additional information size, a terminal position of the reserved region is able to be detected.

Further, in a case where the additional information is not transmitted, it is also possible that 0 is stored in the additional information size and the additional information is not transmitted. In this case, a data size of one block is 16 bytes which is a sum from the block ID to the additional information size, thus making it possible to transmit behavior information in a minimum data amount.

[Processing Flow]

Next, processing of transmitting recognition data according to the present embodiment will be described.

Figure 7:
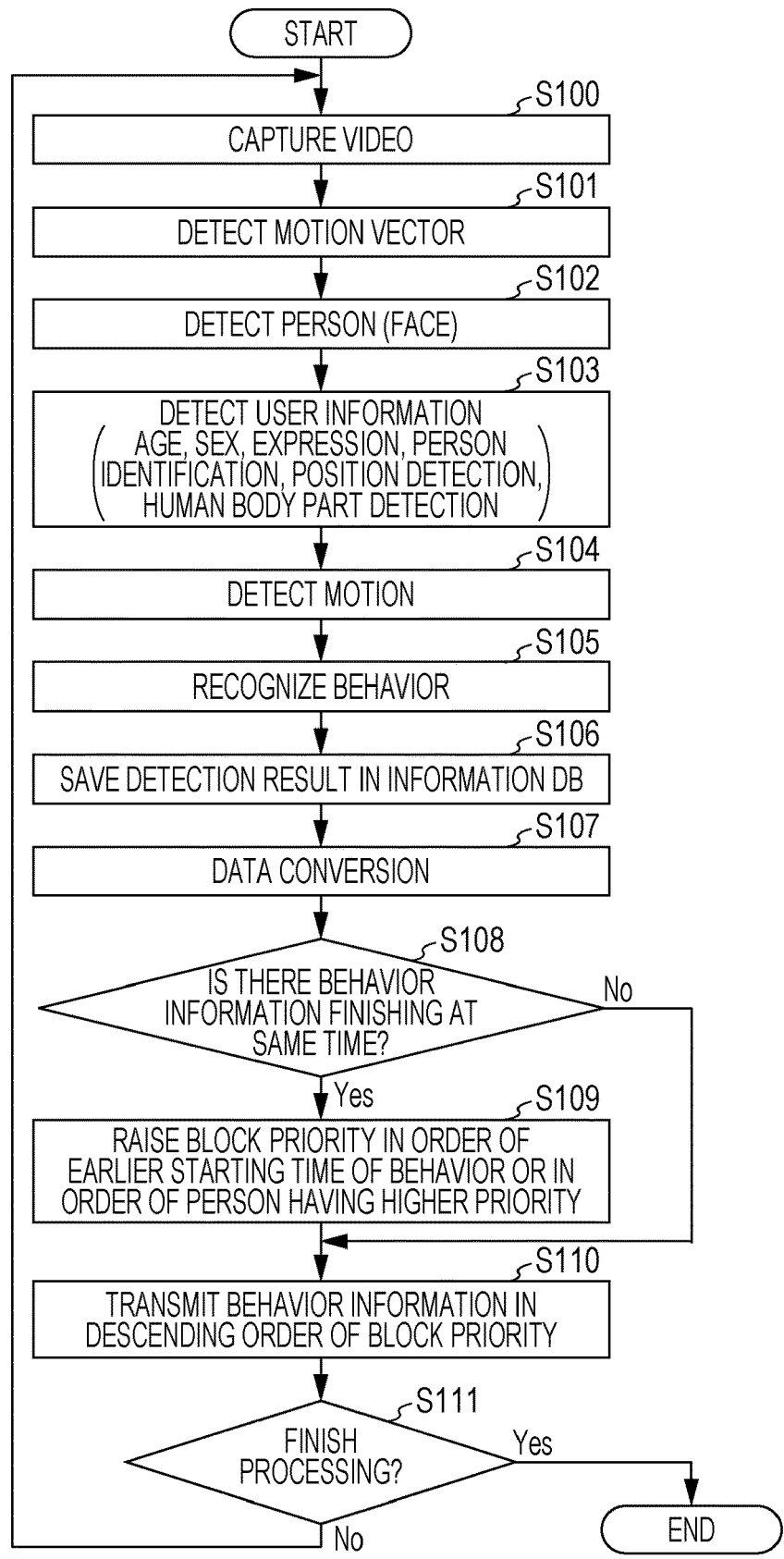
FIG. 7 is a flowchart illustrating a flow of processing of transmitting behavior information.

FIG. 7 is a flowchart illustrating a flow of the processing of transmitting recognition data according to the present embodiment.

(Step S100)

The video analysis unit 11 acquires video data from the image capturing device 10. Next, procedure moves to step S101.

(Step S101)

The motion vector detection unit 110 holds a plurality of frame videos, each of which is captured at a different time, based on the video data captured by the image capturing device 10, detects a region on a video, in which a pixel value changed, as a moving region, and outputs a moving amount thereof. The detected moving amount, moving coordinates, and a moving vector are output as motion vector information. In order to detect a motion amount of a next frame video, a present frame video is saved in the information DB (memory) 12. Next, the procedure moves to step S102.

(Step S102)

The person detection unit 111 detects a person in the video data by using the video data captured by the image capturing device 10 and the motion vector detected at step S101. A face is detected in the video data by the above-described method, and, in a case where there is a face, it is determined that there is a person. Moreover, since a face is not always captured even when a person is in the video, it may be determined that a person exists in the moving region, by using the calculated motion vector. Furthermore, a person may be detected by combining the face detection information and the motion vector. By tracking the detected person, while collating the motion vector output at step S101 and person information detected at step S102, and improving accuracy of person detection and specifying a face detection range for the next frame, it is possible to reduce a calculation amount. Person information such as presence/absence of a person in the video, a position of the person in the video, a size of a face, a facing direction of the face, a feature of a part of the face, and a tracking result of the person is output, and the procedure moves to step S103.

Note that, as described above, an order of the processing of step S101 and the processing step S102 may be switched (step S102 may be performed prior to S101).

(Step S103)

The user information detection unit 112 performs comparison with data of the information DB, which has been registered in advance as a feature of a person, based on the person information calculated at step S102, and the attribute estimation unit 1120 estimates age and sex of the detected person information. Moreover, the expression estimation unit 1121 estimates an expression of the person such as smiling, weeping, or being angry. The person identification unit 1122 performs comparison with a feature of a part of a face of a person, which has been registered in the information DB in advance, checks if there is a registered person coinciding with him/her, and identifies the person who is in the video. In a case where there is a registered person coinciding with him/her, a name of the person is output, and in a case where there is no registered person coinciding him/her, an identification result is output as an unknown person. The position detection unit 1123 outputs a position of the person in the video. The human body part detection unit 1124 detects parts of a human body of the detected person, such as a head, an arm, a hand, a foot, and a trunk, and outputs position information in the video and a size thereof. At step S103, such detected user information is output, and the procedure moves to step S104.

(Step S104)

The motion detection unit 113 detects motion information, which includes a motion and a gesture with a body and hands of the person, from the position information of the person, the human body part information, the motion vector information, and the tracking information of the person, which are detected from the plurality of frame videos each of which is captured at a different time. Then, the procedure moves to step S105.

(Step S105)

Based on the video data captured by the image capturing device 10 and the person information, the user information, and the motion information which are detected, the behavior recognition unit 114 recognizes information related to a behavior of the person (behavior information) such that the person is standing, sitting, sleeping, or falling down, and outputs it as recognition information. The procedure thereafter moves to step S106.

(Step S106)

The recognition information output at the processing of recognizing the behavior at step S105 is saved in the information DB (memory). This is used for detection of the movement information, the tracking information, and the motion information which are recognized between a plurality of frames, and the recognition information detected from present video data is saved. The procedure then moves to step S107.

(Step S107)

In order to transmit the recognition information output at step S106, the recognition information is divided for each behavior of the person, and the recognition information as to one behavior is generated as one piece of block data. The one piece of block data includes the above-described starting and finishing times of a behavior, a behavior ID corresponding to the behavior, and the like. Then, the procedure moves to step S108.

(Step S108)

As to the behavior detected in the input video data, it is determined whether, in this video data, there is different behavior information in which the finish of a behavior has been detected in this video data, that is, the behavior has finished at the same time. In a case where there is the behavior information the behavior of which has finished at the same time (Yes at step S108), the procedure moves to step S109. In a case where there is no different behavior information the behavior of which has finished at the same time (No at step S108), 0x80 (normal data) is stored in a field of a block priority of a block in which the behavior information is stored, and the procedure moves to step S110.

(Step S109)

In the case where there is the behavior information finishing at the same time, a value having a higher priority is stored in a field of a block priority of a block, in which the behavior information is stored, in order of earlier starting time of the behavior. For example, as to behavior information whose starting time of a behavior is the latest, 0x80 (normal data) is stored in the block priority thereof. As to behavior information whose starting time of a behavior is earlier, a value having a higher priority is stored in the block priority thereof, such that, as to behavior information whose starting time of a behavior is next earlier, 0x81 is stored in the block priority thereof. In addition, for a case where there is behavior information whose starting time of a behavior is the same, a person having a higher priority is set in advance, and a value having a higher priority is to be stored in the block priority thereof as to a behavior of the person having the higher priority. After finishing storing a value of the block priority, the procedure moves to step S110.

(Step S110)

The behavior information detected from the video data is transmitted in a unit of a block. As to an order of transmission, transmission is performed in descending order of a value of the block priority stored in the block. After finishing transmitting behavior information of all blocks, the procedure moves to step S111.

(Step S111)

It is determined whether or not to finish the processing of transmitting the recognition data, for example, whether power is turned off or whether the watching is finished. In a case where it is determined to continue the processing of transmitting the recognition data continuously (No at step S111), the procedure moves to step S100, and a next captured video is acquired. In a case where it is determined that the processing of transmitting the recognition data has been finished (Yes at step S111), the processing ends.

As above, by recognizing a behavior of a person from video data captured by the image capturing device 10 and transmitting behavior information, which is recognized for each behavior, in a unit of a block, it is possible to transmit minimum data as information for watching, thus making it possible to reduce an amount of transfer data. Further, though it has been necessary for a watching side to view video data at all times conventionally for confirmation of safety, by notifying only predetermined behavior information or performing selection from transmitted behavior information, it is possible to notify safety information such that a behavior needs urgent reaction or a person is living safe, so that convenience is greatly improved.

Note that, in the present embodiment, though description has been given for the recognition data transmission device which transmits recognized data, it is needless to say that a recognition data recording device which records recognized data is also able to be realized similarly.

Second Embodiment

[Transmission in a Case of Abnormality]

Next, an example of a case where behavior information at in a case of abnormality is transmitted in addition to the behavior information indicated in FIG. 2 will be described with reference to FIG. 8.

As to behaviors of a person, there are behaviors, which represent the case of abnormality, such as falling down and leaving in addition to behaviors which represent ordinary life such as "standing" or "smiling" described in FIG. 2. Since the behavior in the case of abnormality needs to be dealt with urgently in many cases generally, information thereof is required to be notified to a watching side earlier than normal behavior information. Accordingly, in FIG. 8, a person B starts a behavior of "walking" first, and while "walking" is being continued, a person A starts a behavior of "falling down". Then, after the behavior of "walking" of the person B is finished, the behavior of "falling down" of the person A is finished. According to a rule of the transmission order of the first embodiment (FIG. 2), since behavior information is transmitted in order of finish of a behavior, behavior information of "walking" of the person B is to be transmitted before behavior information of "falling down" of the person A. However, since the behavior of "falling down" of the person A is an urgent behavior in the case of abnormality, the behavior information of "falling down" of the person A in FIG. 8 is set as a block 4 (indicated with a thick frame) and transmitted before the behavior information of "walking" of the person B (block 5). In this manner, in a case where a predetermined behavior in the case of abnormality or the like is detected, by transmitting the information before other behavior information, it is possible to immediately notify the watching side of emergency information.

Note that, it is set here that the behavior of "falling down" starts at a time when the person A starts falling down, and at a time point after the person A lies down on a floor or the ground and then spends a certain time without moving, the behavior of "falling down" finishes. Therefore, it may take some time until the behavior of falling down is detected, and a situation where "falling down" of the person A is detected after the behavior of "walking" of the person B is finished may be caused in some cases, and in this case, the behavior information of "walking" of the person B is transmitted earlier. Then, since it is necessary to perform transmission to the watching side as soon as possible in a case where a behavior at the time of abnormality is detected, when it is possible to predict that the person A is falling down at a stage of starting falling down, the behavior information thereof may be transmitted at a stage where the prediction is able to be made before the detection of the behavior of falling down is finished.

[Behavior Information]

Next, behavior information, which is stored in a block to be transmitted, in the present embodiment will be described.

In a case where "falling down" of the person A is able to be detected during a behavior time of "walking" of the person B, an ID 8 (FIG. 6(a), falling down) is stored in the behavior ID of FIG. 5, and 0xFF (emergency data) is stored in the block priority. Then, in addition to a value of 4 as the block ID, other information is stored similarly to the above, and the behavior information of "falling down" of the person A is transmitted as the block 4 before the behavior information of "walking" of the person B.

Then, after the behavior of "walking" of the person B is finished, an ID 3 (FIG. 6(a), walking) is stored in the behavior ID of FIG. 5, and 0x80 (normal data) is stored in the block priority. Then, in addition to a value of 5 as the block ID, other information is stored similarly to the above, and the behavior information of "walking" of the person B is transmitted as the block 5.

With respect to such behavior data in the case of abnormality, by storing information indicating high priority in the field of the block priority and transmitting behavior information in the case of abnormality before other block data, it is possible to immediately notify the watching side of the behavior information in the case of abnormality.

[Processing Flow]

Next, processing of transmitting recognition data in the case of abnormality according to the present embodiment will be described.

Figure 9:
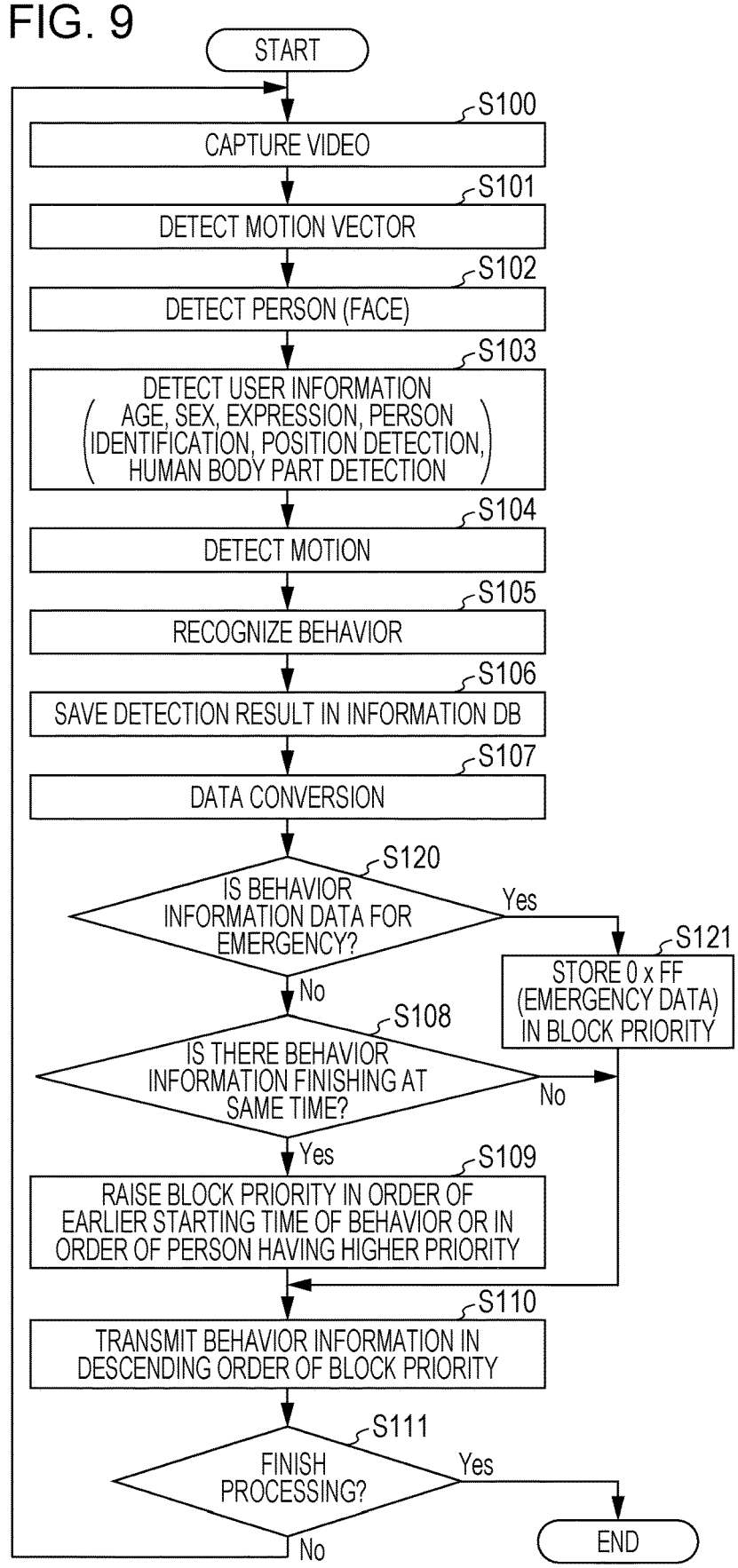
FIG. 9 is a flowchart illustrating a flow of processing of transmitting behavior information in a case of abnormality in the recognition data transmission device according to the second embodiment of the invention.

FIG. 9 is a flowchart illustrating a flow of the processing of transmitting recognition data in the case of abnormality according to the present embodiment.

Since steps S100 to S111 are similar to the above, description thereof will be omitted.

(Step S120)

It is determined whether or not the recognized information recognized from the video data of the image capturing device 10 is behavior information in the case of abnormality such as "falling down" or "leaving", which has been registered in advance. Since the behavior information in the case of abnormality is urgent in many cases, the transmission order of blocks is changed. In a case where the behavior information is data for emergency (Yes, at step S120), the procedure moves to step S121. In a case where the behavior information is not the data for emergency (No at step S120), the procedure moves to step S108.

(Step S121)

In a case where the recognized behavior information is for emergency, the value of 0xFF which indicates that the behavior information is emergency data is stored in the field of the block priority in the block. This indicates that the detected behavior information is the emergency data, so that the block is to be transmitted the earliest at step S110.

As above, in a case where the recognized behavior information is for the case of abnormality which is urgent, it is possible to transmit the information before behavior information of a different person. Thus, the watching side is able to be quickly informed of the behavior in the case of abnormality, which has been registered in advance.

Third Embodiment

[Transmission of Still Image]

Figure 8:
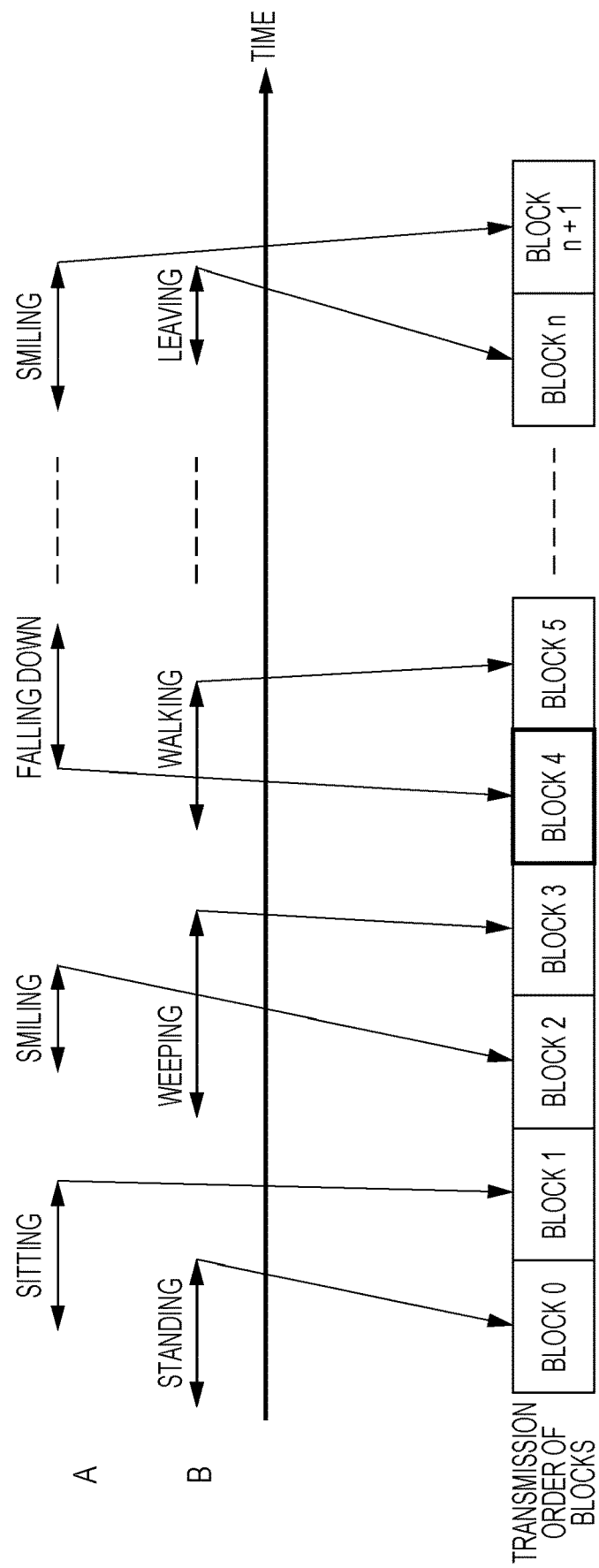
FIG. 8 is an illustration of an example of transmission of behavior information in a case of abnormality in a recognition data transmission device according to a second embodiment of the invention.
Figure 10:
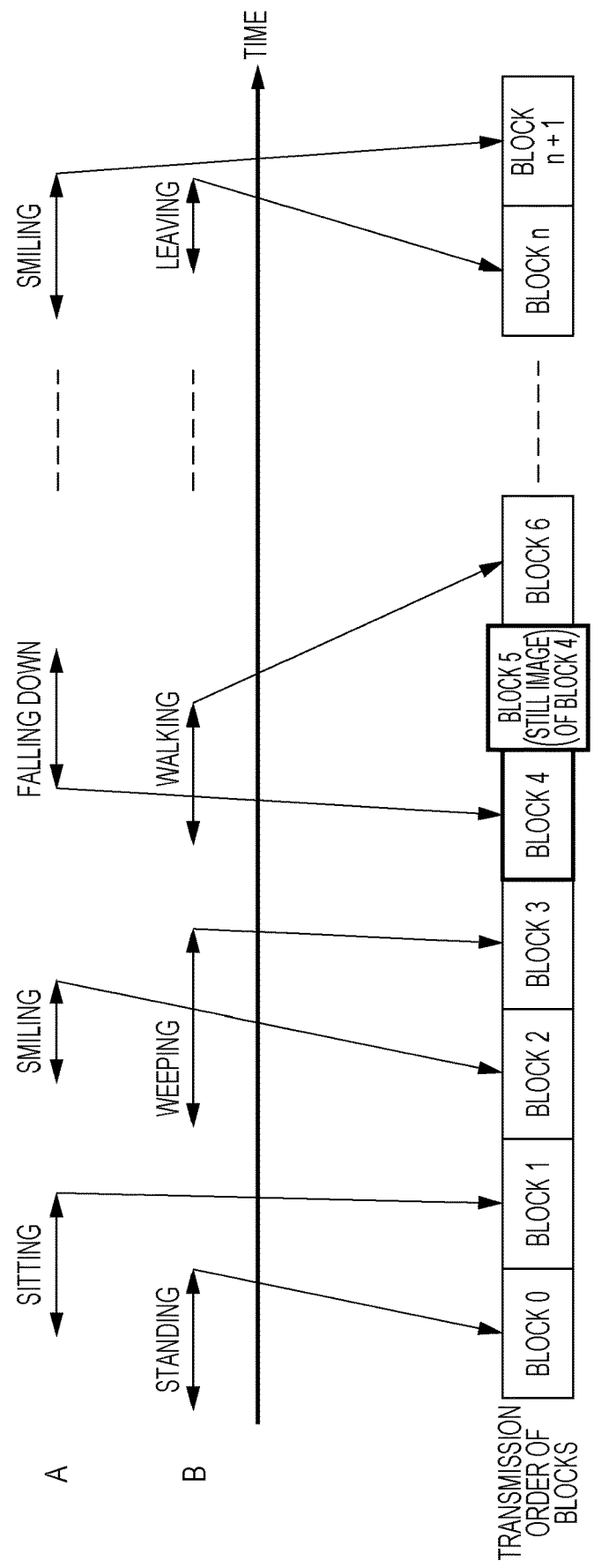
FIG. 10 is an illustration of an example of transmission of video data corresponding to behavior information in a case of abnormality in a recognition data transmission device according to a third embodiment of the invention.

Next, an example of a case where, in addition to the behavior information when the behavior in the case of abnormality of FIG. 8 is recognized, a corresponding still image is transmitted will be described with reference to FIG. 10.

In the present embodiment, when transmitting the behavior information in the case of abnormality of FIG. 8, in order to not only notify the watching side of the abnormality but also inform the situation with a video, a still image is transmitted with the behavior information. At a stage of detecting the behavior of "falling down" of the person A, the behavior information is transmitted as the block 4, and, after the transmission of the block 4, a still image obtained by capturing the situation of "falling down", which corresponds to the block 4, is transmitted as a block 5. Thereafter, the behavior information of "walking" of the person B (block 6) is transmitted. By transmitting the behavior information and the still image in this manner, it is possible to immediately notify an information display terminal of the watching side of the behavior in the case of abnormality and the still image representing the situation. By transmitting the corresponding still image in the case of abnormality, as compared with watching service or a monitoring camera which is currently in the market and mainly provided by video transmission, only minimum necessary information (including the still image) may be transmitted and it is possible to substantially reduce an amount of transmission data. Further, in the case of watching, when all of behavior information for one day is received, the amount of data becomes enormous. In a case where only video data is transmitted, it is necessary to view videos all day long, which is extremely inconvenient. Accordingly, in the case of a normal behavior, behavior information indicating the behavior is transmitted, and, in a case where abnormality occurs, by transmitting a corresponding video with behavior information thereof, it is possible to improve convenience for the watching side and reduce an amount of data transmission, and consequently reduce power consumption. The still image may be a thumbnail image.

[Block 4: Transmission of Behavior Information]

Next, behavior information which is stored in a block to be transmitted in the present embodiment will be described.

In a case where "falling down" of the person A is able to be detected during the behavior time of "walking" of the person B, the ID 8 (falling down) is stored in a behavior ID of FIG. 11, and 0xFF (emergency data) is stored in a block priority. Then, a video (still image) obtained by capturing a situation of "falling down" of the person A is recorded in a format described below, and video (still image) data is transmitted as a block ID 5. An ID of the block 5 which is the transmitted video data is stored in a region of additional information of FIG. 11.

(Video Block Information)

After text information in the region of the additional information, the number of videos in a sixth field and a video block ID in a seventh field are stored. The video block ID stores therein a block ID of a block in which video data (still image) corresponding to detected behavior information is stored. A recording region which stores therein one video block ID has a fixed length of 3 bytes and a plurality of video block IDs are able to be stored in order. Accordingly, a region of the video block ID has a size having a variable length. The number of stored video block IDs is stored in the field of the number of videos. A recording region of the field of the number of videos has 1 byte, and is able to store therein video block IDs from 1 to 255. In a case where a value of the field of the number of videos is 0, it is indicated that there is no video block ID, and indicated that data is not stored in the region of the video block ID and there is no video data corresponding to behavior information.

In this case, a value of 5 which is the ID of the block 5 in which the video data corresponding to the block 4 is stored is stored in a field of a video block ID 1, and a value of 1 which is the number of pieces of recorded video data is stored in the number of videos. Though an example in which the block 5 is transmitted as the video data corresponding to one piece of behavior information has been described in the present embodiment, without limitation thereto, two or more pieces of video data may be transmitted with respect to one piece of behavior information. In this case, as many corresponding block IDs as the number of pieces of video data to be transmitted are stored in the field of the video block ID, and the number of pieces of the data is stored in the field of the number of videos. Examples in which a plural number of pieces of corresponding video data are stored in this manner include a case where two or more of videos (still images or moving images) captured at different angles or videos of different times are transmitted with respect to a piece of behavior information. Additionally, it is possible to use two or more pieces of video data in a case where, when the video data indicates a moving image, one piece of video data is divided into a plurality of blocks and transmitted, in a case where both of a still image and a moving image are transmitted, and the like.

Then, in addition to a value of 4 as the block ID, other information is stored similarly to the above, and the behavior information of "falling down" of the person A is transmitted as the block 4 before the behavior information of "walking" of the person B.

[Block 5: Transmission of Video Data]

Next, a structure of data of a block in which video data is transmitted will be described with reference to FIG. 12.

FIG. 12 is an illustration for explaining an order and a content of data which is stored from the head of the block in which the video data is transmitted. The data to be stored in the block is data in a binary format according to a format in FIG. 12. As information to be stored in the block, a block ID, a video data flag, a corresponding ID, a codec ID, a data size, and video data are stored in this order from the head.

(Block ID)

The block ID in a first field is a specific ID added to each block, and a value is stored in order from 0 with respect to each block to be transmitted. A recording region of the block ID has a fixed length of 3 bytes, and stores therein a value from 0 to 0xFFFFFF. Since the block 5 is transmitted as the video data corresponding to the block 4 in this case, "5" is stored in the block ID.

(Video Data Flag)

The video data flag in a second field stores therein information indicating whether the block to be transmitted is video data or behavior information. A recording region of the video data flag has a fixed length of 1 byte, and a value of 0 is stored in the case of a block in which video data is stored. Though a field of a block in which behavior information is stored, which corresponds to the video data flag, is the block priority, since the block priority stores therein a value of 1 or more, it is possible to determine whether to be the block of the video data or the block of the behavior information by determining whether a value in a 1-byte region at a third byte from the head of the block, in which information of this field is stored, is 0 or the other value. Moreover, in the case of acquiring priority of the video data, the acquisition is enabled by referring to the block priority of the block ID, which is indicated by a field of the corresponding ID described below.

(Corresponding ID)

The corresponding ID in a third field stores therein the block ID of the behavior information which refers to the block of the video data. A recording region of the corresponding ID has a fixed length of 3 bytes, and stores therein the value from 0 to 0xFFFFFF of the block ID of the behavior information which refers to the block of the video data. In this case, stored is "4" which is the ID of the block 4 of the behavior information which refers to the block 5 in which the video data is stored.

(Codec ID)

The codec ID in a fourth field stores therein codec information of the stored video data. A recording region of the codec ID has a fixed length of 1 byte, and stores therein an ID indicating a type of a codec indicated in FIG. 13. For example, in a case where the video data to be transmitted is a still image and bitmap data, a value of 1 is stored as the codec ID. In a case where the video data to be transmitted is a moving image and in MPEG data, a value of 8 is stored as the codec ID. Though description here has been given by using IDs indicating coding systems as the codec information, a format of a container format in which the video data is stored may be stored. For example, in the case of a format of MP4 in which video data generated with a codec of H.264 is stored, a value of 12 is stored as the codec ID. In this case, in order to acquire the codec information, by interpreting 12 of the codec ID and recognizing that a format is MP4, metadata of MP4 data, which is stored in the video data, is interpreted, thus making it possible to acquire the codec information. When JPEG data is used here for a still image of the video data corresponding to the behavior information of the block 4, for example, "3" is stored as the codec ID.

Note that, 0 of the codec ID means that there is no codec information, and may be used in the case of transmitting a block without storing video data in the block of the video data, in the case of transmitting video data having an unknown codec which is not defined in the types of codecs, or in the case of transmitting data other than video data.

Moreover, a codec ID may be additionally defined later in addition to the types of codecs from 0 to 13 indicated in FIG. 13. Thus, codec IDs 14 to 255 are secured as reserved regions. In the case of adding codec information later, the codec IDs 14 to 255 are used and a type of a codec is newly defined.

(Data Size)

The data size in a fifth field stores therein a data size of the stored video data. A recording region of the data size has a fixed length of 4 bytes, and stores therein size information in a unit of byte. A maximum data size which is able to be stored is 4 Gbytes. In the case of transmitting data having a large size such that the size of the video data exceeds 4 Gbytes, transmission may be performed by dividing it into a plurality of blocks as described above.

(Video Data)

In the video data in a sixth field, the video data is stored. A recording region of the video data has a variable length from 0 to 4 Gbytes, and stores therein the video data from the head of the field of the video data. In the case of transmitting a block in which no video data is stored, a value of 0 is stored in the field of the data size, and nothing is stored in the field of the video data. In this case, a data size of the entire block is 12 bytes which is obtained by summing the recording regions from the block ID to the data size.

Then, as to the block 5 in which the video data is stored, the video data related to "falling down" of the person A is transmitted as the block 5 after the block 4.

[Block 6: transmission of Behavior Information]

Next, after the behavior of "walking" of the person B is finished, an ID 3 (walking) is stored in the behavior ID of FIG. 11, and 0x80 (normal data) is stored in the block priority. Then, in addition to a value of 6 as the block ID, other information is stored similarly to the above, and the behavior information of "walking" of the person B is transmitted as the block 6 after the blocks 4 and 5.

By providing a mechanism of, with respect to such behavior data in the case of abnormality, storing information indicating a high priority in the field of the block priority and transmitting behavior information at the time of abnormality before other block data, it is possible to immediately notify the watching side of the behavior information in the case of abnormality.

Note that, though description has been given for the transmission of the still image as the video corresponding to the behavior in the case of abnormality, a moving image (of a period) corresponding to the behavior may be transmitted as the block data. The moving image corresponding to the behavior is stored in the field of the video data in FIG. 12 as the video data, and, as codec information thereof, the codec ID stores therein a value (for example, MPEG whose codec ID is the value of 8 or the like). The watching side analyzes the received behavior information and the additional information thereof, and, in a case where the codec is for a moving image such as MPEG, may send the video data stored in the field of the video data to a decoder and reproduce moving image data by using the codec indicated with the codec ID.

Moreover, a still image or a moving image to be transmitted may be transmitted correspondingly not only to a behavior in the case abnormality but also to a normal behavior such as smiling. Since confirmation of safety is able to be performed with a video by transmitting an image of a smile, it is possible to increase a feeling of security of a watching side. By allowing setting, in advance, a video to be transmitted for each behavior in accordance with a request of the watching side, the video may be transmitted according to a behavior. What is set here is information as to whether or not to transmit a video in accordance with a behavior, or, in the case of transmitting a video, whether to transmit a still image or a moving image, for example.

Though the example has been described above in which the block 5 where the video data is stored is transmitted immediately after the block 4, the block 5 may be transmitted after the behavior information of the block 6 is transmitted. According to efficiency of data transfer or design of the system, the block 5 may be transmitted before or after the block 4, or may be transmitted between the block 4 and other blocks. As long as in a state where the watching side has no problem, the blocks of the behavior information and the video data may be transmitted in any order. This is because it is possible to refer to the block of the corresponding video data from the behavior information with the field of the video block ID, and, to the contrary, it is possible to refer to the block ID of the behavior information, which refers to the video data, from the video data with the field of the corresponding ID, and thus making it possible to refer to the blocks corresponding to each other regardless of the transmission order of blocks.

[Processing Flow]

Next, processing of transmitting recognition data in the case of abnormality according to the present embodiment will be described.

Figure 14:
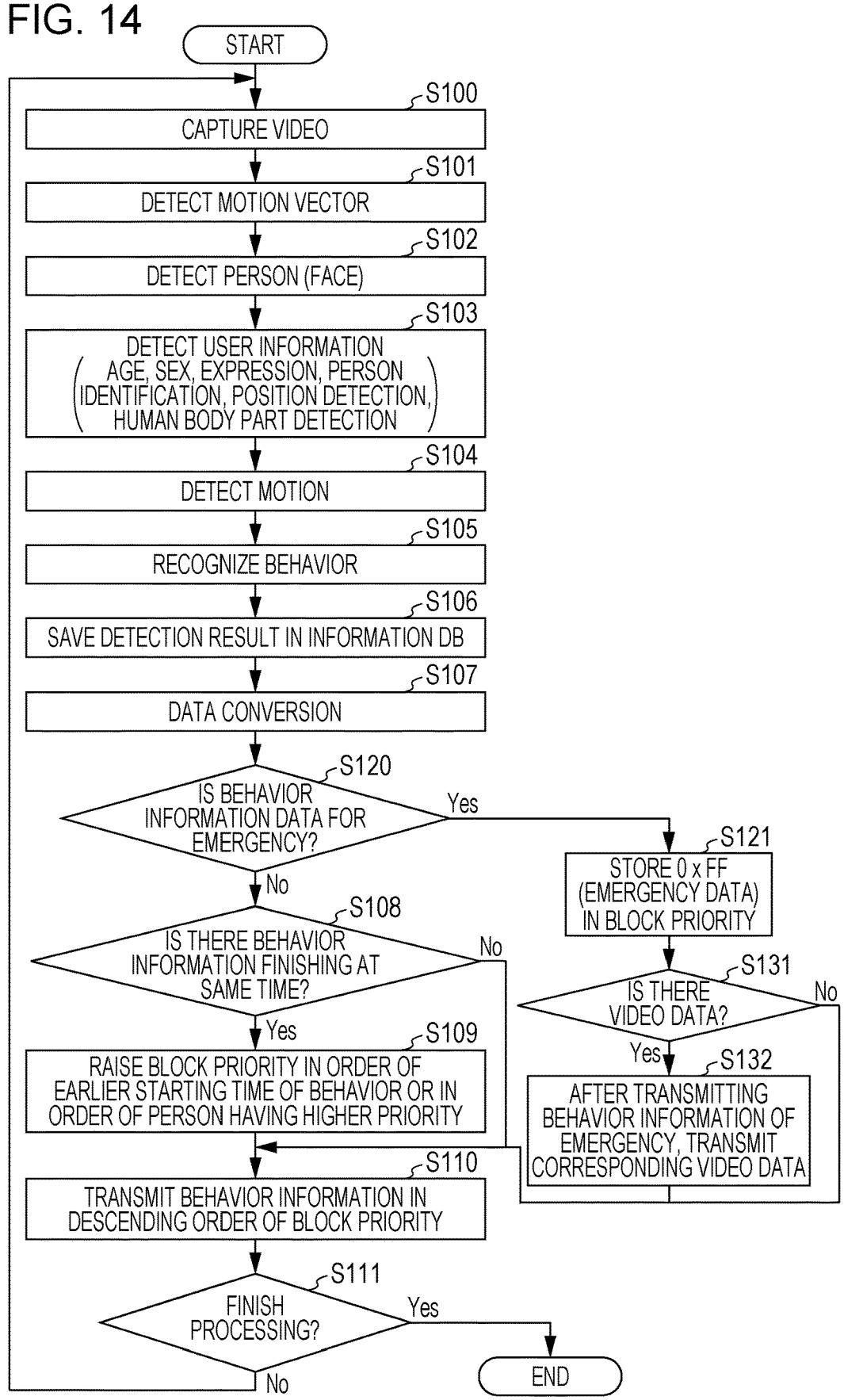
FIG. 14 is a flowchart illustrating a flow of processing of transmitting video data corresponding to behavior information in a case of abnormality according to the third embodiment of the invention.

FIG. 14 is a flowchart illustrating the processing of transmitting recognition data in the case of abnormality according to the present embodiment.

Since steps S100 to S111 and S120 to S121 are similar to the above, description thereof will be omitted.

(Step S131)

In the case of detecting behavior information in emergency, transmitting video data thereof is the best way for informing the watching side about what kind of situation it is. Accordingly, an image in which a behavior in emergency is detected is stored in the above-described block of the video data and transmitted. In the case of detecting the behavior information in emergency and transmitting the video data (Yes at step S131), the procedure moves to step S132. In the case of transmitting the behavior information in emergency and not transmitting the video data (No at step 131), the procedure moves to step S110.

(Step S132)

In the case of transmitting the video data in emergency, after a block in which the behavior information is stored is transmitted, a block in which the corresponding video data is stored is transmitted. Since there are a plurality of pieces of video data to be transmitted in some cases, blocks of the video data are transmitted in order of video block IDs stored in the behavior information after the block of the behavior information is transmitted. After all of the block of the behavior information and the blocks of the video data are transmitted, the procedure moves to step S110.

As above, it is possible to immediately transmit, in the case of detecting behavior information of urgent abnormality, not only the behavior information but also video data thereof. Even when a watching side receives a notification of urgent behavior information, an extent or importance thereof is difficult to be known, but with transmission of a video thereof, it is possible to take a quick and appropriate measure. In addition, by transmitting not only video data of emergency but also an image at a time of waking up or an image of having a pleasant time in an ordinary life, it is possible to give the watching side a feeling of security.

As the description above, when, by the method of the present embodiment, a behavior of a person is recognized and behavior information thereof is transmitted in a unit of a behavior, it is possible to reduce an amount of data and improve convenience for a watching side. Further, in a case of recognizing a behavior in the case of abnormality such as "falling down", by storing behavior information thereof as information whose priority is raised to be higher than other information and transmitting the behavior information earlier, it is possible to immediately notify the watching side of the behavior in the case of abnormality. In addition, in the case of the behavior in the case of abnormality, by adding a video thereof, it is possible to quickly provide means of confirming safety to the watching side, and reduce an amount of transmission data for performing watching with the efficient amount of transmission.

A face, a movement, and a motion of a person, which are detected from a captured video of at least one of the image capturing devices, are able to be used for various application of, for example, watching a child or elders, detection of intrusion of a suspicious person, or an operation on a home appliance.

According to each of the embodiments of the invention, by transmitting feature data or behavior data of a person detected from a video to a watching side, it is possible for the watching side to receive a notification of, for example, information that the person is living safety, such as waking up in the morning or viewing the TV or information that abnormality such as falling down occurs, without viewing a transmitted video at all times. Moreover, by transmitting the feature data or the behavior data of the person detected from the video in a unit of a behavior of the person, it is possible to reduce an amount of transmission data.

Furthermore, by not transmitting video data of a watched side and transmitting detection information such as behavior data, it is possible to realize a watching system taking privacy of the watched side into consideration.

Note that, though the example of monitoring a person has been described above, an animal or the like may be a monitoring object.

A part of the recognition data transmission device in the above-described embodiments such as, for example, the motion vector detection unit 110, the person detection unit 111, the user information detection unit 112, the motion detection unit 113, the behavior recognition unit 114, the information DB 12, the data conversion unit 13, and the transmission control unit 14 may be realized by a computer. In this case, it may be realized by recording a program for realizing these controlling functions in a computer readable recording medium and causing a computer system to read and execute the program recorded in the recording medium. Note that, the "computer system" described here is a built-in computer system in the recognition data transmission device and is assumed to include an OS and hardware of peripheral equipment and the like. Moreover, the "computer readable recording medium" refers to a portable medium such as a flexible disk, an optical magnetic disk, a ROM, or a CD-ROM, or a storage device such as a built-in hard disk in a computer system. Further, the "computer readable recording medium" may include one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in that case. The aforementioned program may be one for realizing a part of the functions described above, and further may be one capable of realizing the functions described above in combination with a program which has been already stored in a computer system.

A part or the entirety of the recognition data transmission device in the embodiments described above may be realized as an integrated circuit such as LSI (Large Scale Integration). Each functional block of the recognition data transmission device may be realized as an individual processor, or a part or all thereof may be integrated into a processor. Furthermore, the circuit integration method is not limited to the LSI and may also be realized with dedicated circuits or general processors. Further, in a case where a technique for making into an integrated circuit in place of the LSI appears with advance of a semiconductor technique, an integrated circuit by the technique may be used.

Each component of the invention can be selected optionally, and an invention which includes the selected configuration is also included in the invention.

As above, though description has been given in detail for the embodiments of the invention with reference to drawings, specific configurations thereof are not limited to the above, and various design change and the like can be made within the range of the scope of the invention.

The invention includes following disclosure.

(Additional Notes)

(1) A recognition data transmission device, including:

at least one image capturing unit;

a person detection unit that detects a feature of a person from a video captured by the image capturing unit and specifies the person in the video from the detected feature;

a behavior recognition unit that recognizes a behavior of the person, which includes information related to the person and a motion of the person, from the feature related to the person, which is detected by the person detection unit;

a data conversion unit that divides recognition information, which is output by the behavior recognition unit, for each behavior of the person on a time axis, and generates divided block data; and a transmission control unit that performs control for transmitting the block data, which is output by the data conversion unit, to an outside as recognition data for each block.

According to the invention, a person detected from a video and a behavior thereof are detected and information thereof is transmitted in a unit of a behavior of the person. Accordingly, it is possible to achieve both of improvement in convenience for a watching side and reduction in transmission data.

(2) A recognition data transmission device, including:

at least one image capturing unit;

a person detection unit that detects a feature of (a part or an entirety of a body of) a person from a video captured by the image capturing unit and specifies the person in the video from the detected feature;

a user information detection unit that detects user information indicating physical features of the person from the feature related to the person, which is detected by the person detection unit;

a motion detection unit that detects a motion (a motion or a gesture with a body and hands) of a user from the user information output by the user information detection unit and the video captured by the image capturing unit;

a behavior recognition unit that recognizes a behavior including the motion of the person from motion information output by the motion detection unit and the user information;

a data conversion unit that divides recognition information, which is output by the behavior recognition unit, for each behavior of the person on a time axis, and generates divided block data; and a transmission control unit that performs control for transmitting the block data, which is output by the data conversion unit, to an outside as recognition data for each block.

According to the invention, a person detected from a video and a behavior thereof are detected and information thereof is transmitted in a unit of a behavior of the person. Accordingly, it is possible to achieve both of improvement in convenience for a watching side and reduction in transmission data.

(3) Furthermore, the recognition data transmission device according to (1) or (2), in which only the recognition information output by the behavior recognition unit is output and transmitted to the outside.

Video data in which a watched side is captured is not transmitted and only the recognition information is transmitted to the outside. Accordingly, it is possible to achieve both of protection of privacy of the watched side (improvement in confidentiality of personal information) and reduction of transmission data.

(4) The recognition data transmission device according to any one of (1) to (3), in which the transmission control unit recognizes, with a time point at which the behavior is finished as a reference, that detection of the behavior is finished, and transmits behavior information in order of finishes of detection.

One behavior may be transmitted in a minimum unit of behavior information, which is from start to finish of the behavior. Moreover, in the case of transmitting a video thereof with the behavior information, the behavior information and the video data may be specified by referring to a starting time and finishing time of the behavior, so that it is possible to search for a video corresponding to the behavior.

(5) The recognition data transmission device according to (4), in which the transmission control unit sets a higher priority to behavior information in order of an earlier starting time of a behavior and transmits the behavior information in descending order of priority in a case where the time point at which the behavior is finished is the same.

Information about a person whose behavior is successfully recognized is transmitted earlier than others. Accordingly, it is possible to efficiently transmit data.

Moreover, in a case where there are pieces of behavior information finishing at the same time, whose starting times of behaviors are also the same, a person who has a higher priority is set in advance in order to set a higher priority to a behavior of the person having the higher priority and the behavior information may be transmitted in descending order of priority.

(6) The recognition data transmission device according to any one of (1) to (5), in which in a case where urgent behavior information (including information that the person is not present or the person has fallen down and been unable to move) is detected among the recognition information output by the behavior recognition unit, emergency information indicating emergency is stored in a divided block data for each behavior of the person, and the transmission control unit performs control so as to transmit the block data having the emergency information before other block data.

(7) The recognition data transmission device according to (6), in which in a case where the urgent behavior information is detected, the behavior recognition unit outputs video data captured by the image capturing unit, which corresponds to the behavior information, and the transmission control unit transmits the video data corresponding to the urgent behavior information before other block data excluding block data in which the urgent behavior information is stored.

(8) The recognition data transmission device according to (7), in which the data conversion unit stores information which allows the urgent behavior information and the corresponding video data to refer to each other.

(9) The recognition data transmission device according to any one of (2) to (8), in which the user information output by the user information detection unit is information about features of the person (information including a position of a face, a direction of the face, sex, age, expression, or parts of a human body of the person).

(10) The recognition data transmission device according to any one of (1) to (9), in which the recognition information output by the behavior recognition unit is information indicating a behavior (including that the person is standing, sitting, sleeping, falling down, or leaving).

(11) A recognition data recording device, including:

at least one image capturing unit;

a person detection unit that detects a feature of (a part or an entirety of a body of) a person from a video captured by the image capturing unit and specifies the person in the video from the detected feature;

a behavior recognition unit that recognizes a behavior of the person, which includes information related to the person and a motion of the person, from the feature related to the person, which is detected by the person detection unit;

a data conversion unit that divides recognition information, which is output by the behavior recognition unit, for each behavior of the person on a time axis, and generates divided block data; and a recording control unit that causes a recording unit to record the block data, output by the data conversion unit, as recognition data.

According to the invention, a person detected from a video and a behavior thereof are detected and information thereof is recorded in a unit of a behavior of the person. Accordingly, it is possible to achieve both of improvement in convenience for a watching side and reduction in an amount of storing data.

(12) A recognition data recording device, including:

at least one image capturing unit;

a person detection unit that detects a feature of (a part or an entirety of a body of) a person from a video captured by the image capturing unit and specifies the person in the video from the detected feature;

a user information detection unit that detects user information indicating physical features of the person from the feature related to the person, which is detected by the person detection unit;

a motion detection unit that detects a motion (a motion or a gesture with a body and hands) of a user from the user information output by the user information detection unit and the video captured by the image capturing unit;

a behavior recognition unit that recognizes a behavior including the motion of the person from motion information output by the motion detection unit and the user information;

a data conversion unit that divides recognition information, which is output by the behavior recognition unit, for each behavior of the person on a time axis, and generates divided block data; and a recording control unit that causes a recording unit to record the block data, output by the data conversion unit, as recognition data.

According to the invention, a person detected from a video and a behavior thereof are detected and information thereof is recorded in a unit of a behavior of the person. Accordingly, it is possible to achieve both of improvement in convenience for a watching side and reduction in an amount of storing data.

(13) A method of transmitting recognition data, including:

a person detection step of detecting a feature of a person from a video captured by at least one image capturing unit and specifying the person in the video from the detected feature;

a behavior recognition step of recognizing a behavior of the person, which includes information related to the person and a motion of the person, from the feature related to the person, which is output at the person detection step;

a data conversion step of dividing recognition information, which is output at the behavior recognition step, for each behavior of the person on a time axis, and generating divided block data; and a transmission control step of performing control for transmitting the block data, output at the data conversion step, to an outside as recognition data for each block.

(14) A method of transmitting recognition data, including:

a person detection step of detecting a feature of a person from a video captured by at least one image capturing unit and specifying the person in the video from the detected feature;

a user information detection step of detecting user information indicating physical features of the person from the feature related to the person, which is detected at the person detection step;

a motion detection step of detecting a motion (a motion or a gesture with a body and hands) of a user from the user information output at the user information detection step and the video captured by the image capturing unit;

a behavior recognition step of recognizing a behavior including the motion of the person from motion information output at the motion detection step and the user information;

a data conversion step of dividing recognition information, which is output at the behavior recognition step, for each behavior of the person on a time axis, and generating divided block data; and a transmission control step of performing control for transmitting the block data, which is output at the data conversion step, to an outside as recognition data for each block.

(15) A program for causing a computer to execute the method of transmitting recognition data according to (13) or (14).

(16) A computer readable recording medium in which the program of (15) is stored.

(17) A method of recording recognition data, including:

a person detection step of detecting a feature of (a part or an entirety of a body of) a person from a video captured by at least one image capturing unit and specifying the person in the video from the detected feature;

a behavior recognition step of recognizing a behavior of the person, which includes information related to the person and a motion of the person, from the feature related to the person, which is output at the person detection step;

a data conversion step of dividing recognition information, which is output at the behavior recognition step, for each behavior of the person on a time axis, and generating divided block data; and a recording control step of causing a recording unit to record the block data, output at the data conversion step, as recognition data.

(18) A method of recording recognition data, including:

a person detection step of detecting a feature of (a part or an entirety of a body of) a person from a video captured by at least one image capturing unit and specifying the person in the video from the detected feature;

a user information detection step of detecting user information indicating physical features of the person from the feature related to the person, which is detected at the person detection step;

a motion detection step of detecting a motion (a motion or a gesture with a body and hands) of a user from the user information output at the user information detection step and the video captured by the image capturing unit;

a behavior recognition step of recognizing a behavior including the motion of the person from motion information output at the motion detection step and the user information;

a data conversion step of dividing recognition information, which is output at the behavior recognition step, for each behavior of the person on a time axis, and generating divided block data; and a recording control step of causing a recording unit to record the block data, output at the data conversion step, as recognition data.

(19) A program for causing a computer to execute the method of recording recognition data according to (17) or (18).

(20) A computer readable recording medium in which the program of (19) is stored.

INDUSTRIAL APPLICABILITY

The invention is able to be used as a recognition data transmission device.

REFERENCE SIGNS LIST 10 image capturing device
101, 102 to n image capturing unit
11 video analysis unit
12 information DB
13 data conversion unit
14 transmission control unit
110 motion vector detection unit
111 person detection unit
112 user information detection unit
1120 attribute estimation unit
1121 expression estimation unit
1122 person identification unit
1123 position detection unit
1124 human body part detection unit
113 motion detection unit
114 behavior recognition unit All publications, patents and patent applications cited in this specification are incorporated herein by reference in their entirety.

The invention claimed is:

1. A recognition data transmission device, comprising:
an image capturing unit;
a person or animal identifier that detects a feature of a person or an animal from a video captured by the image capturing unit and specifies the person or the animal in the video from the detected feature;
a behavior recognition unit that recognizes a behavior of the person or the animal, and produces recognition information including information identifying the person or the animal and the behavior of the person or the animal, the behavior of the person or the animal being classified as either an urgent behavior or a non-urgent behavior;
a data conversion unit that divides the recognition information output by the behavior recognition unit, for each behavior of the person or the animal on a time axis, and generates at least one block of data for a behavior of the person or the animal, each said block of data storing at least one of the recognition information associated with the behavior or the video captured by the video capturing unit corresponding to the recognition information; and
a transmission control unit that performs control for transmitting the block data, which is output by the data conversion unit, to outside of the transmission device, for each block,
wherein the transmission control unit
performs control for transmitting the block data, which is output by the data conversion unit, to an outside as recognition data for each block including the recognition information,
recognizes, with a time point at which the behavior is finished as a reference, that detection of the behavior is finished, and transmits the block data in order of completion of detection, and performs control such that when the behavior of the person or the animal is considered non-urgent behavior, no image data is transmitted as part of the recognition information and, when the behavior of the person or the animal is considered urgent behavior, image data of the behavior considered urgent is transmitted.

2. The recognition data transmission device according to claim 1, wherein
the transmission control unit sets a higher priority to the recognition information in order of an earlier starting time of a behavior in a case where the priority is the same and the time point at which the behavior is finished is also the same.

3. The recognition data transmission device according to claim 1, wherein
in a case where urgent recognition information identifying behavior considered urgent is detected among the recognition information output by the behavior recognition unit, urgent information indicating urgency is stored in the block data generated for each behavior, and
the transmission control unit transmits the block data having the urgent information before other block data.

4. The recognition data transmission device according to claim 3, wherein
in a case where the urgent recognition information is detected, the behavior recognition unit outputs a video captured by the image capturing unit, which corresponds to the recognition information, and
the transmission control unit transmits the block data storing the video corresponding to the urgent recognition information before other block data excluding block data in which the urgent recognition information is stored.

5. The recognition data transmission device according to claim 4, wherein
the data conversion unit stores information which allows the urgent recognition information and the corresponding video to refer to each other in at least one of the block data storing the recognition information and the block data storing the video.

6. The recognition data transmission device according to claim 1, wherein
the transmission control unit transmits, to an outside, the block data storing only the recognition information output by the behavior recognition unit.

7. The recognition data transmission device according to claim 1 wherein the block data includes video and is transmitted with the behavior information when behavior that is considered urgent is detected.

8. The recognition data transmission device according to claim 1, wherein
the transmission control unit detects the recognition information, in which plural behaviors having overlapping behavior times from start to finish of the behavior are detected, and
when it is possible to predict that a behavior is abnormal among the detected recognition information, the transmission control unit recognizes that the behavior is abnormal at a stage of predicting abnormality before the abnormal behavior is finished, and sets a higher priority to the recognition information indicating the recognized abnormal behavior.

9. A recognition data recording device, including:
an image capturing unit;
a person or animal detection unit that detects a feature of (a part or an entirety of a body of) a person or an animal from a video captured by the image capturing unit and specifies the person or the animal in the video from the detected feature;
a behavior recognition unit that recognizes a behavior of the person or the animal and produces recognition information including information identifying the person or the animal and the behavior of the person or the animal, from the feature related to the person or the animal, which is detected by the person or the animal detection unit;
a data conversion unit that divides the recognition information, output by the behavior recognition unit, for each behavior of the person or the animal on a time axis, and generates divided block data; and
a recording control unit that causes a recording unit to record the block data, output by the data conversion unit, as recognition data, wherein the recording control unit records, with a time point at which the behavior is finished as a reference, that detection of the behavior recognized by the behavior unit is finished, and performs control such that when the behavior of the person or the animal is not considered urgent behavior, block data that stores the video corresponding to the recognition information among the pieces of the block data is not recorded and where the behavior of the person or the animal is considered urgent behavior, image data of the behavior considered urgent is recorded.

10. The recognition data recording device according to claim 9 wherein said recording control unit records behavior information representing the behavior of the person or the animal, and wherein the block data includes video and is recorded with the behavior information when behavior that is considered urgent is detected.

11. A method of storing recognition data, including:

detecting a feature of a person or an animal from a video captured by at least one image capturing unit and specifying the person or the animal in the video from the detected feature;

recognizing a behavior or movement of the person or the animal specified in said detecting, which includes information related to the person or the animal and a motion of the person or the animal, from the feature and outputting the information related to the person or the animal and their or its behavior as recognition information;

dividing the recognition information, which is output from the recognizing, for each behavior of the person or the animal on a time axis, and generating divided block data; and transmitting the block data, output as recognition data for each block, wherein the recognizing recognizes, with a time point at which the behavior is finished as a reference, that detection of the behavior is finished, wherein said transmitting transmits the recognition information representing the behavior of the person or the animal in order of completion of detection, and performs control such that when the behavior of the person or the animal is not considered urgent behavior, block data that stores the video corresponding to the recognition information among the pieces of the block data is not transmitted and where the behavior of the person or the animal is considered urgent behavior, image data of the behavior considered urgent is transmitted.

12. The method of storing according to claim 11 wherein the block data includes video and is transmitted with the behavior information when behavior considered to be urgent is detected.

13. A method of recording recognition data, including:

detecting a feature of (a part or an entirety of a body of) a person or an animal from a video captured by at least one image capturing unit and specifying the person or the animal in the video from the detected feature;

recognizing a behavior of the person or the animal specified in said detecting, which includes information related to the person or the animal and a motion of the person or the animal, from the feature related to the person or the animal, and outputting the information related to the person or the animal and their or its behavior as recognition information;

dividing the recognition information, which is output from the recognizing, for each behavior of the person or the animal on a time axis, and generating divided block data; and recording the block data, as recognition data, and performing control such that when the behavior of the person or the animal is not considered urgent behavior, block data that stores the video corresponding to the recognition information among the pieces of the block data is not recorded and where the behavior of the person or the animal is considered urgent behavior, image data of the behavior considered urgent is recorded.

14. The recognition data transmission device according to claim 13 wherein the block data includes video and is transmitted with the behavior information when behavior considered to be urgent is detected.

* * * * *